(12) United States Patent
Kim et al.

(10) Patent No.: US 11,362,421 B2
(45) Date of Patent: Jun. 14, 2022

(54) ANTENNA AND DEVICE CONFIGURATIONS

(71) Applicant: QUALCOMM Incorporated, San Diego, CA (US)

(72) Inventors: Jeongil Jay Kim, San Diego, CA (US); Alberto Cicalini, Tortona (IT); Mohammad Ali Tassoudji, San Diego, CA (US); Jorge Fabrega Sanchez, San Diego, CA (US); Taesik Yang, San Diego, CA (US); Kevin Hsi-Huai Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 16/727,640

(22) Filed: Dec. 26, 2019

(65) Prior Publication Data

US 2020/0212569 A1     Jul. 2, 2020

Related U.S. Application Data

(60) Provisional application No. 62/785,621, filed on Dec. 27, 2018.

(51) Int. Cl.
*H01Q 5/307* (2015.01)
*H01Q 1/24* (2006.01)
(Continued)

(52) U.S. Cl.
CPC ............ *H01Q 5/307* (2015.01); *H01Q 1/243* (2013.01); *H01Q 1/421* (2013.01); *H01Q 9/0407* (2013.01)

(58) Field of Classification Search
CPC ...... H01Q 5/307; H01Q 1/243; H01Q 9/0407; H01Q 1/421; H01Q 1/523; H01Q 9/0414; H01Q 21/065; H01Q 15/08; H04B 1/40
See application file for complete search history.

(56) References Cited

U.S. PATENT DOCUMENTS

2010/0259453 A1* 10/2010 Kim .................. H01Q 1/52
                                                343/702
2012/0044113 A1    2/2012 Satoh et al.
(Continued)

FOREIGN PATENT DOCUMENTS

EP        3281251 A1    2/2018
WO     2015066601 A1    5/2015

OTHER PUBLICATIONS

International Search Report and Written Opinioin—PCT/US2019/068714—ISA/EPO—Apr. 24, 2020.

*Primary Examiner* — Yuwen Pan
*Assistant Examiner* — Fatuma G Sherif
(74) *Attorney, Agent, or Firm* — Qualcomm Incorporated

(57) ABSTRACT

An electronic device includes a first antenna, a second antenna, and a device cover. The first antenna may be configured to transmit or receive signals at a first frequency, and the second antenna may be configured to transmit or receive signals at a second frequency. The device cover may be configured to enclose at least a portion of the device, the and may have a first thickness in a first area and a second thickness in a second area. The first area may be substantially aligned with a boresight of the first antenna, and the second area may be substantially aligned with a boresight of the second antenna. The first thickness may be different than the second thickness.

22 Claims, 22 Drawing Sheets

(51) Int. Cl.
*H01Q 9/04* (2006.01)
*H01Q 1/42* (2006.01)

(56) References Cited

U.S. PATENT DOCUMENTS

| | | |
|---|---|---|
| 2012/0112970 A1 | 5/2012 | Caballero et al. |
| 2013/0050056 A1* | 2/2013 | Lee .......................... H01Q 3/30 343/893 |
| 2019/0089052 A1* | 3/2019 | Yong ...................... H01Q 1/243 |
| 2019/0312347 A1* | 10/2019 | Edwards .............. H01Q 9/0435 |

\* cited by examiner

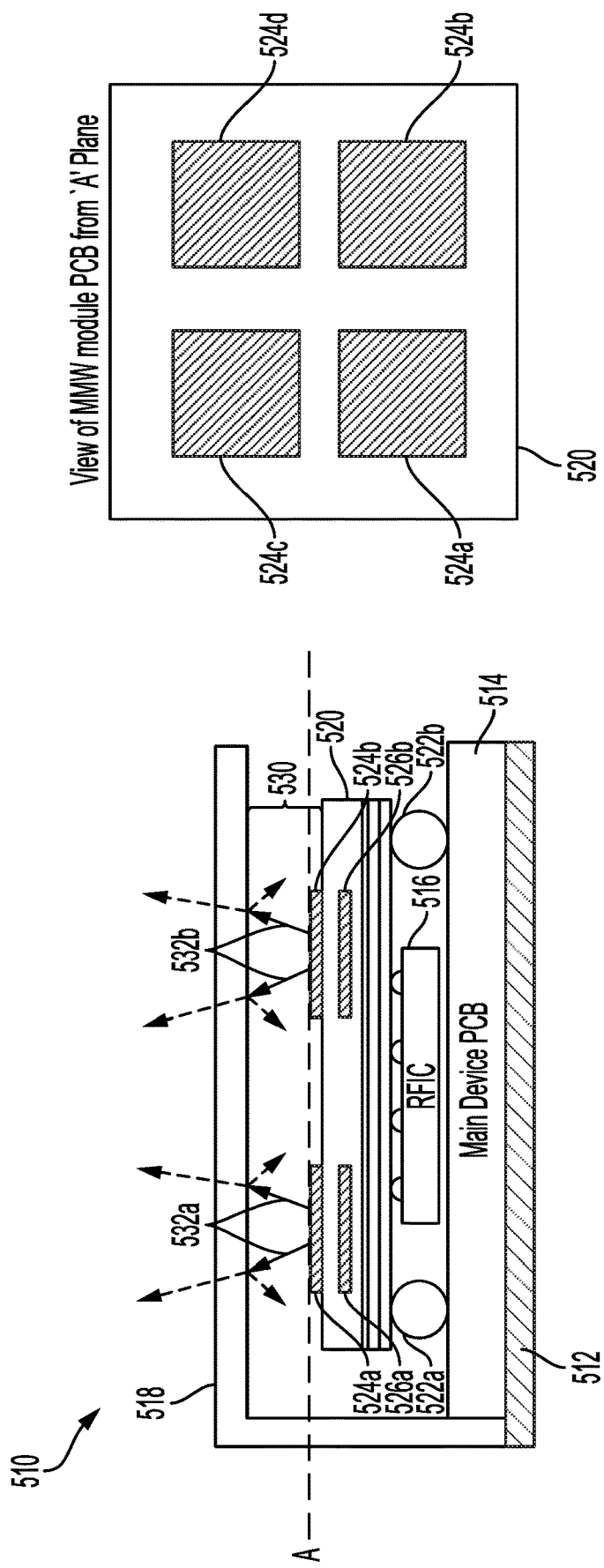

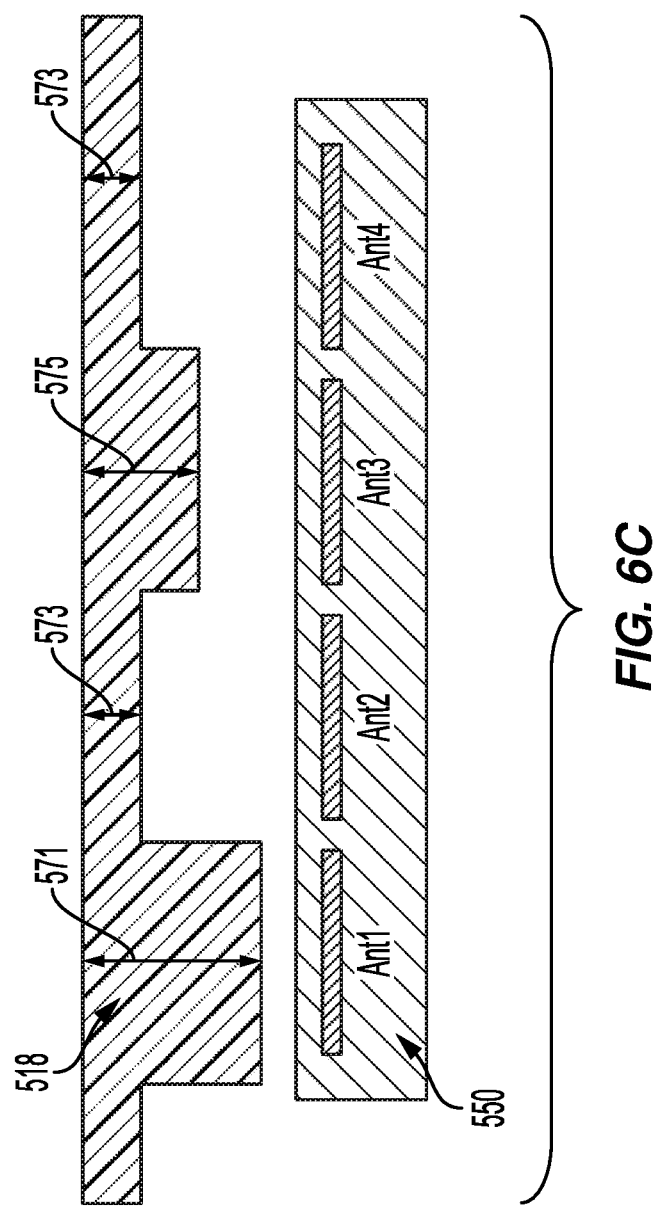

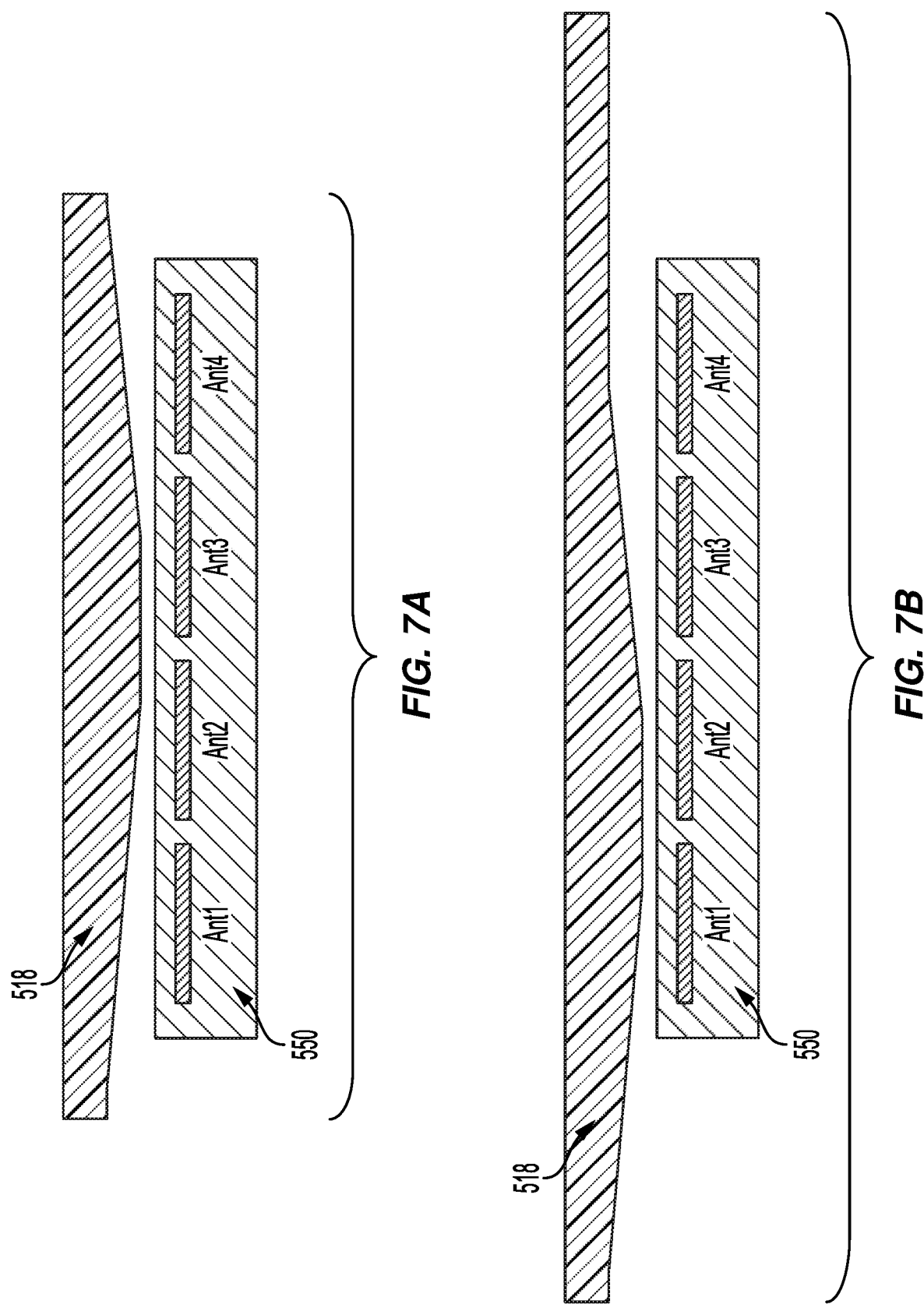

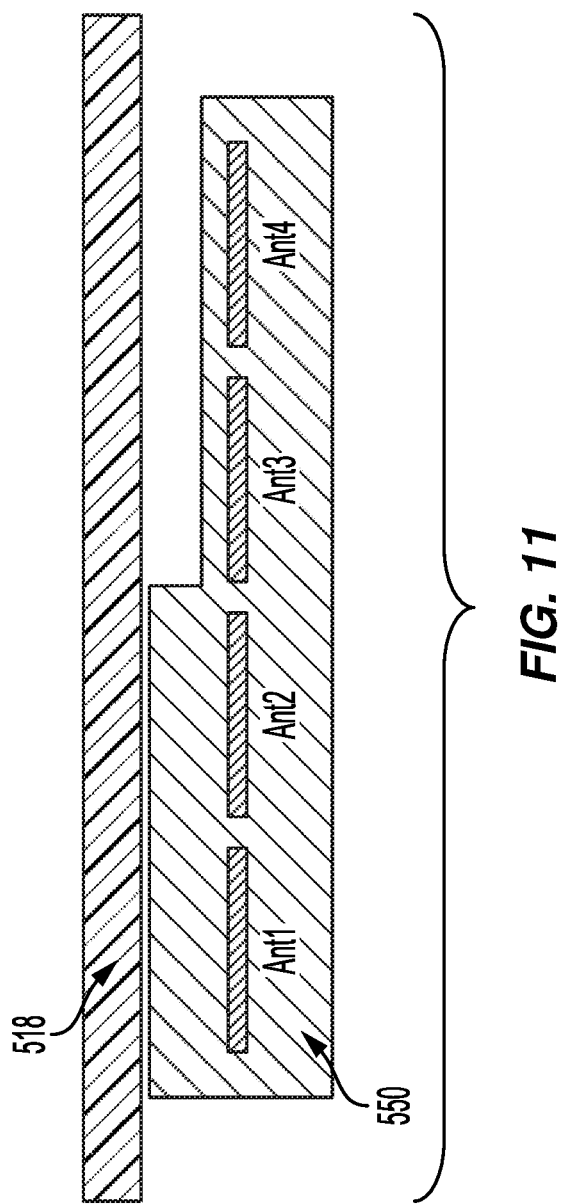

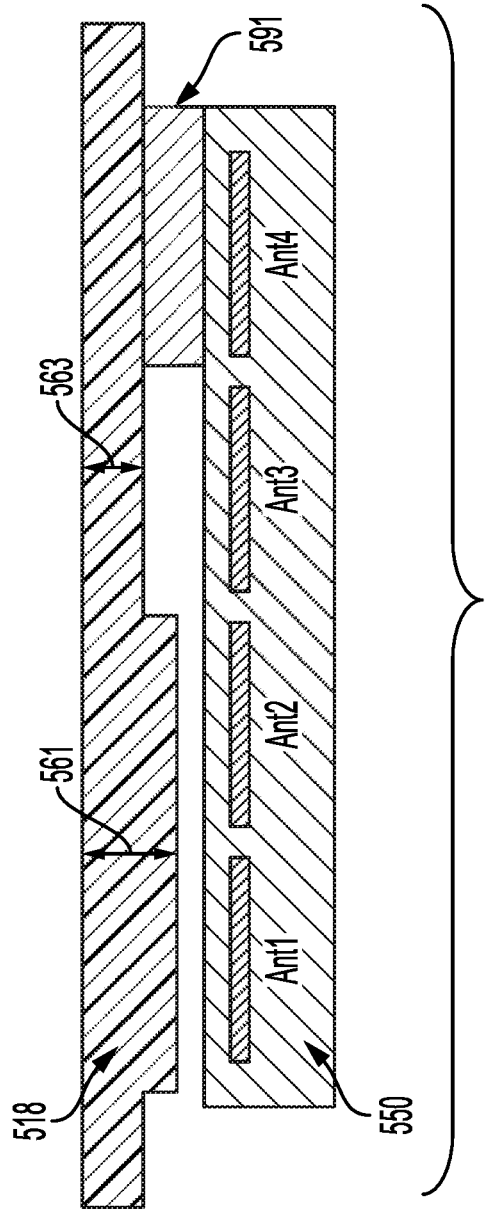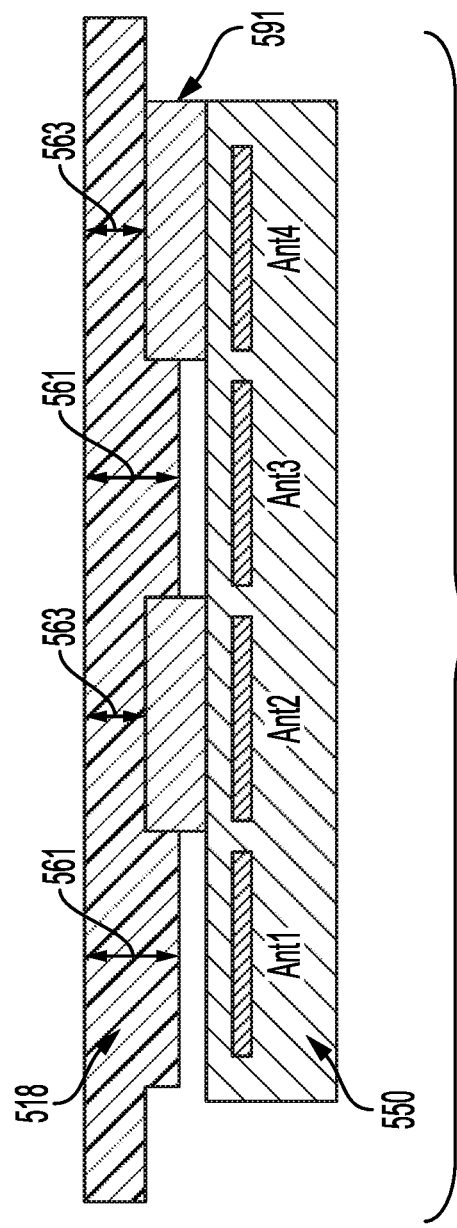
FIG. 12A
FIG. 12B

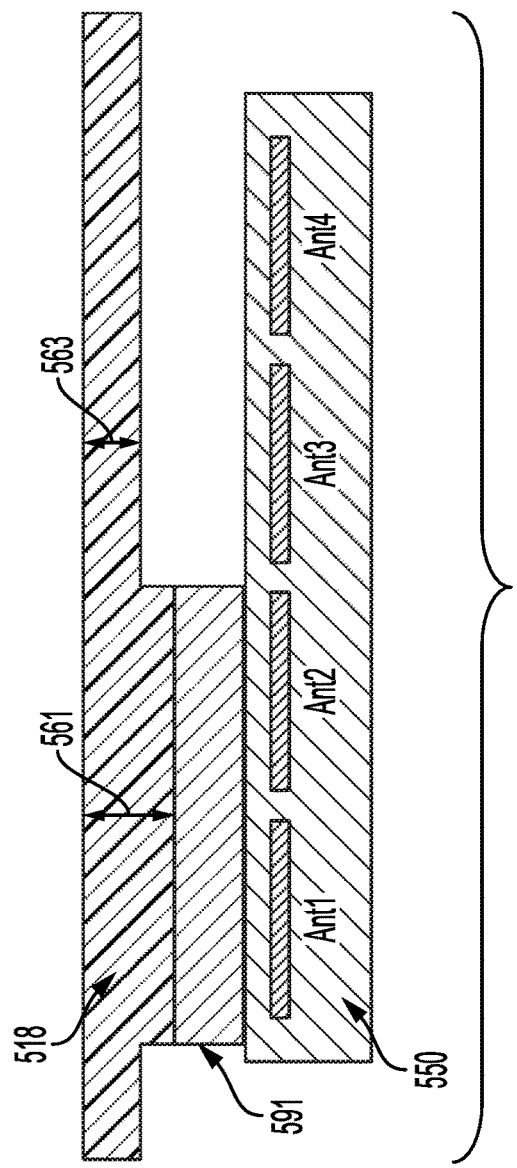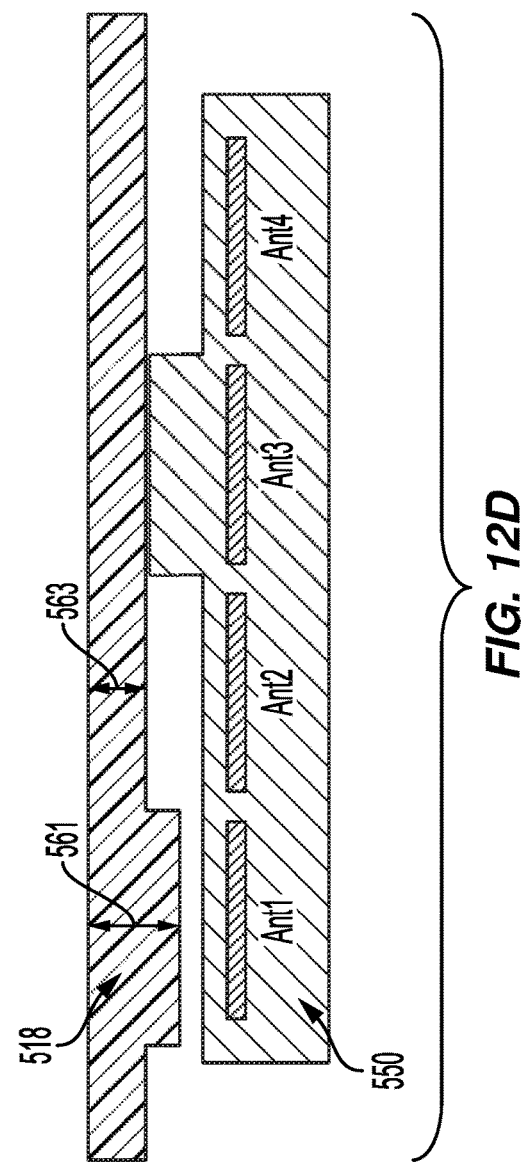

ANTENNA AND DEVICE CONFIGURATIONS

CROSS-REFERENCE TO RELATED APPLICATION(S)

This application claims the benefit of U.S. Provisional Application No. 62/785,621, filed Dec. 27, 2018 and titled ANTENNA AND DEVICE CONFIGURATIONS, the disclosure of which is hereby incorporated by reference in its entirety herein.

TECHNICAL FIELD

This disclosure relates generally to devices which are configured to communicate wirelessly and, more specifically, to antennas for use with such devices and configurations of the device with respect to such antennas.

BACKGROUND

A wireless device (e.g., a cellular phone or a smart phone) may include a transmitter and a receiver coupled to an antenna to support two-way communication, and may be composed of a housing assembly (e.g., cover). In general, the transmitter may modulate a radio frequency (RF) carrier signal with data to obtain a modulated signal, amplify the modulated signal to obtain an output RF signal having the proper power level, and transmit the output RF signal via the antenna to a base station. For data reception, the receiver may obtain a received RF signal via the antenna and may condition and process the received RF signal to recover data sent by the base station. As the radio frequency used by the wireless device increases, attenuation and absorption of the RF signal by the housing assembly may decrease the capabilities of the transmitter and the receiver.

SUMMARY

Certain embodiments described herein include an electronic device having a first antenna, a second antenna, and a device cover. The first antenna may be configured to transmit or receive signals at a first frequency, and the second antenna may be configured to transmit or receive signals at a second frequency. The device cover may be configured to enclose at least a portion of the device, the and may have a first thickness in a first area and a second thickness in a second area. The first area may be substantially aligned with a boresight of the first antenna, and the second area may be substantially aligned with a boresight of the second antenna. The first thickness may be different than the second thickness.

In some configurations as described above, one or both of the antennas may be configured to resonate at a frequency used for communicating signals having a wavelength in the millimeter ranges. For example, such signals may have a frequency of approximately 24 GHz to nearly 70 GHz.

In some configurations as described above, the first antenna may be a substantially planar radiator, and the first area may be substantially aligned with the radiator in a direction normal to a plane of the radiator. Further, the second antenna may be a substantially planar second radiator, and the second area may be substantially aligned with the second radiator in a direction normal to a plane of the second radiator. The first frequency may be lower than the second frequency, and the first thickness may be greater than the second thickness. For example, the first thickness may be approximately half a wavelength of a signal having the first frequency. The device cover may be comprised of a material having a dielectric constant greater than about 8. In some such embodiments, the device cover is comprised of a material (e.g., a ceramic material) having a dielectric constant in the range of about 10 to about 40. The first antenna may be configured to transmit or receive signals at the second frequency.

In some configurations as described above, the electronic device may also have a third antenna configured to transmit or receive signals at the first frequency. The device cover may have the first thickness in a third area, and the third area may be substantially aligned with a boresight of the third antenna. Further, the first, second, and third antennas may be implemented in an antenna array with the second antenna being disposed between the first and third antennas.

In some embodiments of an electronic device having a first antenna, a second antenna, and a device cover, the first antenna may have a first radiator. For example, the first radiator may be disposed substantially in a first plane and have a perimeter defined by a first plurality of sides. A first side of the first plurality of sides may be of a first length. Further, the second antenna may have a second radiator. For example, the second radiator may be disposed substantially in a second plane and have a perimeter defined by a second plurality of sides. A second side of the second plurality of sides may be of a second length. The second length may be different than the first length. Additionally, the device cover may be configured to enclose at least a portion of the device, and may have a first thickness in a first area and a second thickness in a second area. The first area may be substantially aligned with the first radiator in a direction substantially orthogonal to the first plane, and the second area may be substantially aligned with the second radiator in a direction substantially orthogonal to the second plane. The first thickness may be different than the second thickness.

In some configurations as described above, the first length may be longer than the second length, and the first thickness may be greater than the second thickness. The first plane and the second plane may be substantially coplanar. The first plane and the second plane may be angled with respect to one another. For example, the first plane may be disposed such that a boresight of the first antenna passes through a back cover of the electronic device, while the second plane may be disposed such that a boresight of the second antenna passes through a side, top, or bottom edge of the electronic device.

In some configurations as described above, the first antenna further includes a third radiator disposed substantially in a third plane. The third plane may be substantially parallel to the first plane, and the third radiator may be disposed on an opposite side of the first radiator as the first area of the device cover. Further, the third radiator may have a perimeter defined by a third plurality of sides. A first side of the third plurality of sides may be of a third length, and the third length may be greater than the first length.

In some configurations as described above, the electronic device may be configured as a smartphone. The device cover may be a back cover of the smartphone, or may be a portion of a top edge of the smartphone. In other such configurations, the electronic device may be configured as an access point or a base station. Any of these configurations of the electronic device may be configured to communicate at a millimeter wave frequency. Additionally, in any of these configurations of the electronic device, the electronic device may further have a third antenna. The first antenna and the second antenna may be disposed along a first line, and the first antenna and the third antenna may be disposed along a second line. The second line may be angled with respect to the first line.

Other embodiments are also described herein. Further, embodiments other than those described explicitly herein will be understood and appreciated by those of skill in the art based on the included description.

BRIEF DESCRIPTION OF THE DRAWINGS

FIGS. 5A and 5B show a side view and top view of an example patch antenna array in a wireless device.

FIGS. 6A-6C show a side view of an example patch antenna array in a wireless device in relation to a device cover of the wireless device.

FIG. 7A-7C shows a side view of example patch antenna arrays in a wireless device in relation to a device cover of the wireless device.

FIG. 11 shows a side view of an example patch antenna array in a wireless device in relation to a device cover of the wireless device.

FIGS. 12A-12D show a side view of example patch antenna arrays in a wireless device in relation to a device cover of the wireless device.

DETAILED DESCRIPTION

Techniques are discussed herein for improving the performance of an antenna, for example in a mobile device. Many mobile devices include millimeter-wave (MMW) modules to support higher RF frequencies (e.g., $5^{th}$ Generation and/or certain Wi-Fi specifications). These modules may include a multi-layered stack-up to support wideband antennas and/or required signal and power routings to a Radio Frequency Integrated Circuit (RFIC). Current electronic manufacturing techniques create multiple layer integrated circuits (ICs), and each layer may include a high metal density which affects the antenna performance and increases the complexity of the device/circuit layout. Additionally, once a MMW module is integrated into a device, the antenna performance may be affected by the device's cover, for example due to dielectric loading and wave reflection. In general, a device cover is a structure that is disposed around one or more components in order to protect, conceal, contain, etc. those components. For example, a device cover may be a single unit or multi-part assembly configured to enclose the electronic components within a mobile device and thereby provide a protective barrier between the electronic components and environmental elements. For hand-held devices, such as a mobile phone, the device cover provides an external surface which may enable a user to handle or otherwise have physical contact with the mobile device without damaging the circuit elements within the mobile device.

Figure 1:
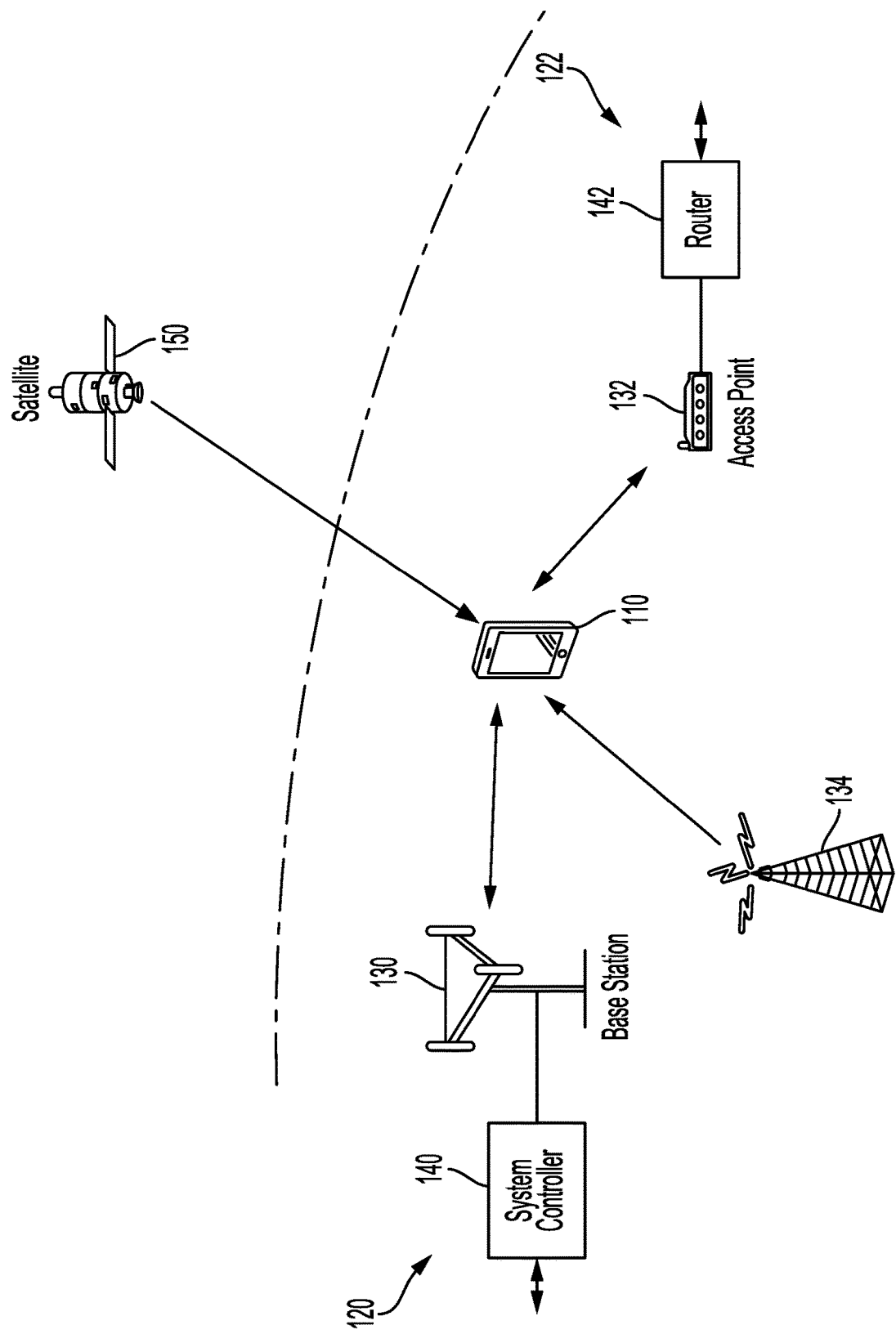
FIG. 1 shows a wireless device capable of communicating with different wireless communication systems.

Referring to FIG. 1, a wireless device 110 capable of communicating with different wireless communication systems 120 and 122 is shown. Wireless system 120 may be a Code Division Multiple Access (CDMA) system (which may implement Wideband CDMA (WCDMA), cdma2000, or some other version of CDMA), a Global System for Mobile Communications (GSM) system, a Long Term Evolution (LTE) system, a 5G system, etc. Wireless system 122 may be a wireless local area network (WLAN) system, which may implement IEEE 802.11, etc. For simplicity, FIG. 1 shows wireless system 120 including one base station 130 and one system controller 140, and wireless system 122 including one access point 132 and one router 142. In general, each system may include any number of stations and any set of network entities.

Wireless device 110 may also be referred to as a user equipment (UE), a mobile device, a mobile station, a terminal, an access terminal, a subscriber unit, a station, etc. Wireless device 110 may be a cellular phone, a smart phone, a tablet, a wireless modem, a personal digital assistant (PDA), a handheld device, a laptop computer, a smartbook, a netbook, a cordless phone, a wireless local loop (WLL) station, a Bluetooth device, an internet of things (IoT) device, a medical device, a device for use in an automobile, etc. Wireless device 110 may be equipped with any number of antennas. Further, other wireless devices (whether mobile or not) may be implemented within the systems 120 and/or 122 as the wireless device 110 and may communicate with each other and/or with the base station 130 or access point 132. For example, such other devices may include internet of things (IoT) devices, medical devices, home entertainment and/or automation devices, etc. Multiple antennas may be used to provide better performance, to simultaneously support multiple services (e.g., voice and data), to provide diversity against deleterious path effects (e.g., fading, multipath, and interference), to support multiple-input multiple-output (MIMO) transmission to increase data rate, and/or to obtain other benefits. Wireless device 110 may be capable of communicating with wireless system 120 and/or 122. Wireless device 110 may also be capable of receiving signals from broadcast stations (e.g., a broadcast station 134). Wireless device 110 may also be capable of receiving signals from satellites (e.g., a satellite 150) in one or more global navigation satellite systems (GNSS).

In general, wireless device 110 may support communication with any number of wireless systems, which may employ radio signals including technologies such as WCDMA, cdma2000, LTE, GSM, 5G, 802.11, GPS, etc. Wireless device 110 may also support operation on any number of frequency bands.

Wireless device 110 may support operation at a very high frequency, e.g., within millimeter-wave (MMW) frequencies from 24 to 300 gigahertz (GHz). For example, wireless device 110 may operate at 60 GHz for 802.11ad. Wireless device 110 may include an antenna system to support operation at MMW frequencies. The antenna system may include a number of antennas, with each antenna being used to transmit and/or receive signals. Generally, each antenna may be implemented with a patch antenna or a strip-type antenna, although other antenna types may be implemented. A suitable antenna type may be selected for use based on the operating frequency of the wireless device, the desired performance, etc. In an exemplary design, an antenna system may include a number of patch and/or strip-type antennas supporting operation at MMW frequency. Other antenna geometries and configurations may also be used. For example strip-shape antennas such as single-end fed, circular, and differential fed structures may be used.

Figure 2:
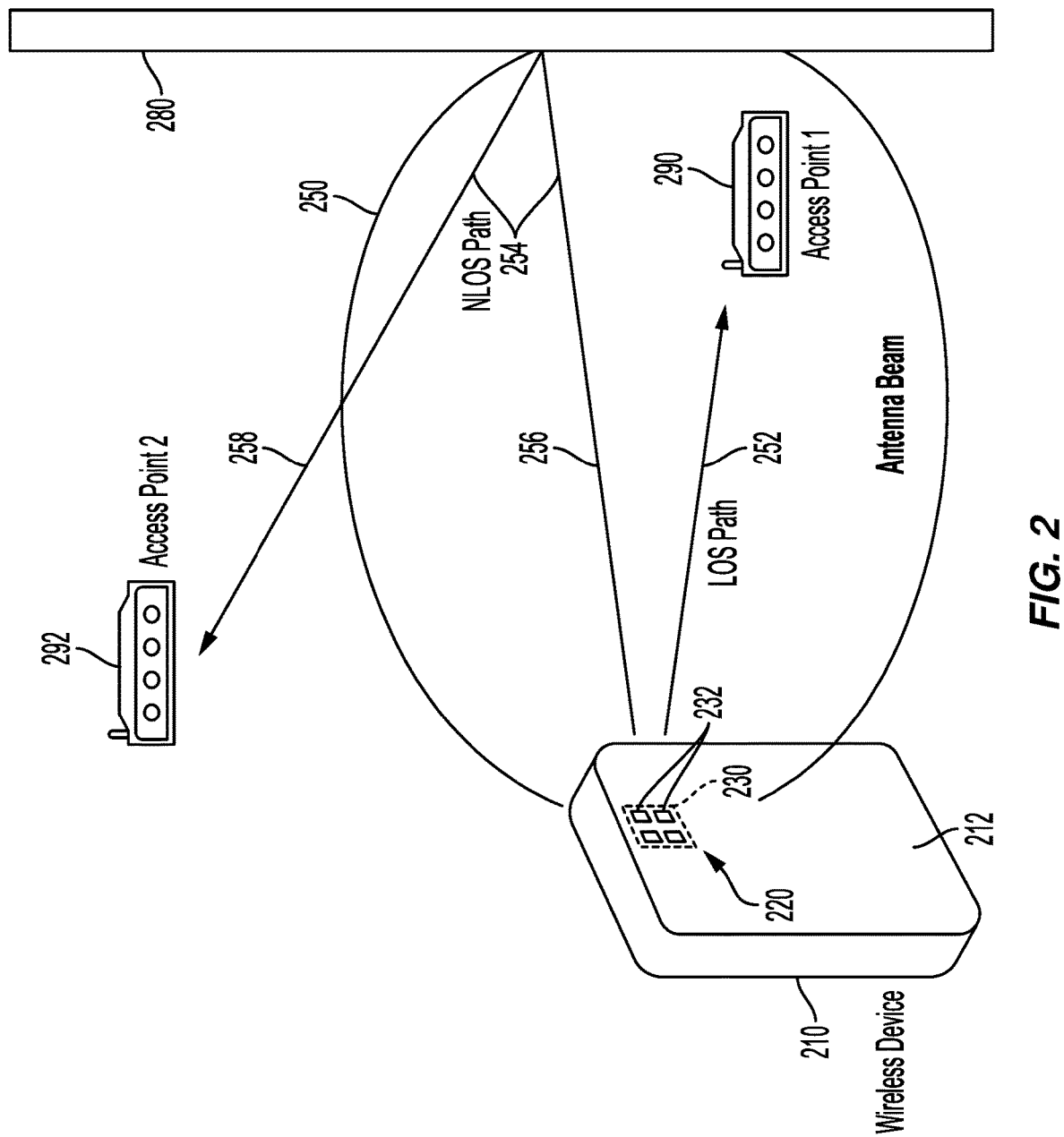
FIG. 2 shows a wireless device with a 2-dimensional (2-D) antenna system.

Referring to FIG. 2, an exemplary design of a wireless device 210 with a 2-D antenna system 220 is shown. In this exemplary design, antenna system 220 includes a 2×2 array 230 of four patch antennas 232, at least a portion of which antennas are formed on a single plane, for example such that the single plane is approximately parallel to a back surface of wireless device 210. While the antenna system 220 is visible in FIG. 2, in operation the patch array may be disposed on a PC board or other assembly located inside of a device cover 212. Each antenna illustrated in FIG. 2 may be used to transmit and/or receive signals. The antenna may have a particular antenna beam pattern and a particular maximum antenna gain, which may be dependent on the design and implementation of the antenna. Multiple antennas may be formed on the same plane and used to improve antenna gain. Higher antenna gain may be desirable at MMW frequency, for example because it may difficult to efficiently generate high power at certain MMW frequency in certain implementations, and attenuation loss may be greater at certain MMW frequency in certain implementations. These limitations may be exacerbated by the presence of a back cover or other housing element or device component between a MMW antenna and other devices with which the wireless device 210 is communicating. The patch antenna array 230 has an antenna beam 250, which may point in a direction that is generally orthogonal to the plane on which patch antennas 232 are formed in some embodiments (and/or which may be steered away from orthogonal in some embodiments). Wireless device 210 can transmit signals directly to other devices (e.g., access points) located within antenna beam 250 and can also receive signals directly from other devices located within antenna beam 250. Antenna beam 250 thus represents a line-of-sight (LOS) coverage of wireless device 210.

For example, an access point 290 (i.e., another device) may be located inside the LOS coverage of wireless device 210. Wireless device 210 can transmit a signal to access point 290 via a line-of-sight (LOS) path 252. Another access point 292 may be located outside the LOS coverage of wireless device 210. Wireless device 210 can transmit a signal to access point 292 via a non-line-of-sight (NLOS) path 254, which includes a direct path 256 from wireless device 210 to a wall 280 and a reflected path 258 from wall 280 to access point 292.

In general, the wireless device 210 may transmit a signal via a LOS path directly to another device located within antenna beam 250, e.g., as shown in FIG. 2. This signal may have a much lower power loss when received via the LOS path. The low power loss may allow wireless device 210 to transmit the signal at a lower power level, which may enable wireless device 210 to conserve battery power and extend battery life. The device cover 212 of the wireless device 210, however, may absorb and/or attenuate the signal and thus impact the extent at which power may be conserved and or the gain at which a signal must be transmitted. Reduction in signal caused by the device cover 212 may be more critical for longer range operations, such as with the NLOS path 254, or in environments in which a device in the LOS path 254, such as the access point 290, is located relatively far away.

The wireless device 210 may transmit a signal via a NLOS path to another device located outside of antenna beam 250, e.g., as also shown in FIG. 2. This signal may have a much higher power loss when received via the NLOS path, since a large portion of the signal energy may be reflected, absorbed, and/or scattered by one or more objects in the NLOS path. Wireless device 210 may transmit the signal at a high power level in an effort to ensure that the signal can be reliably received via the NLOS path. Any negative impact of the absorption and attenuation caused by the device cover 212 may require the wireless device 210 to increase the transmit power, which will negatively impact battery life.

Figure 3:
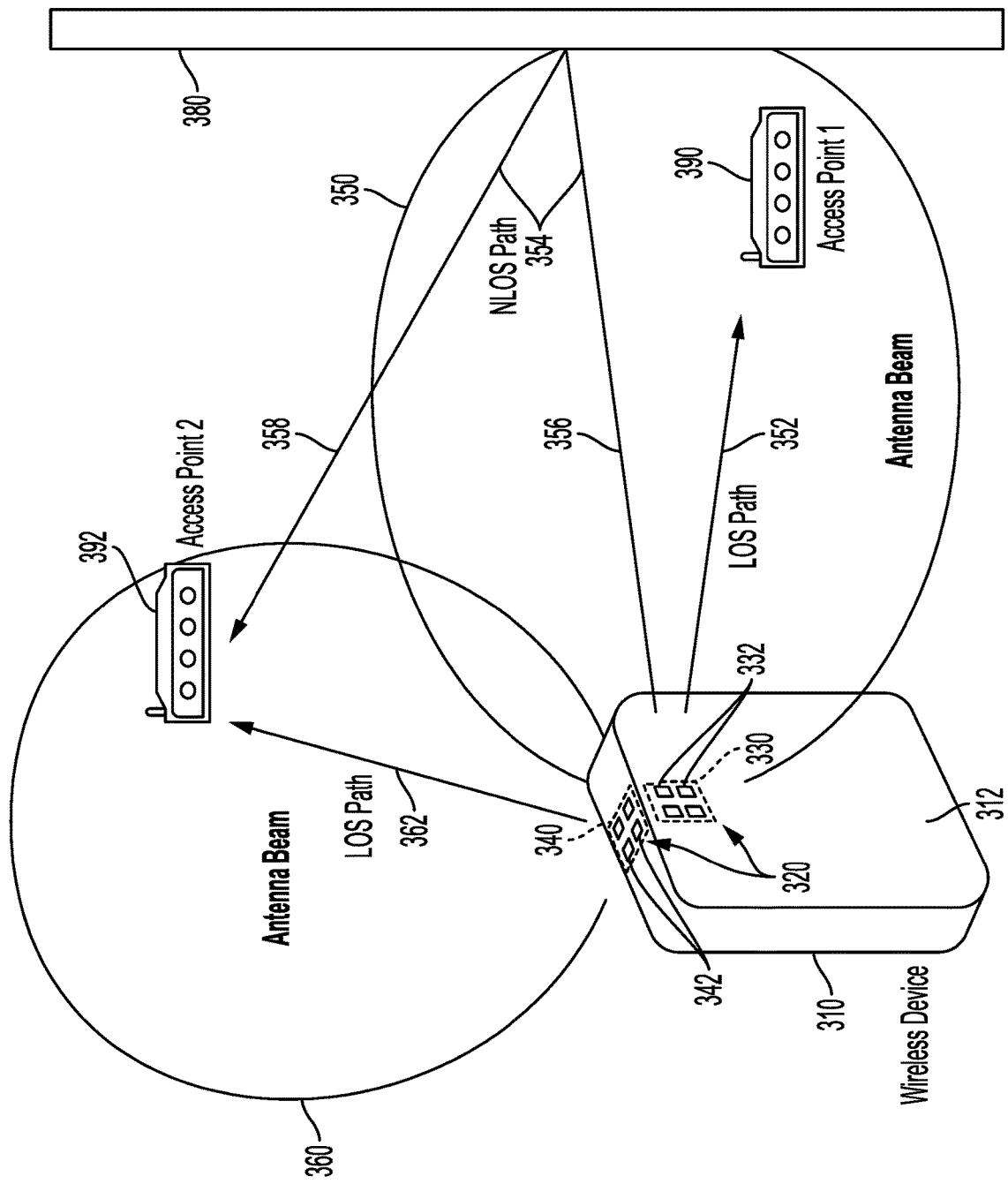
FIG. 3 shows a wireless device with a 3-dimensional (3-D) antenna system.

Referring to FIG. 3, an exemplary design of a wireless device 310 with a 3-D antenna system 320 is shown. In this exemplary design, antenna system 320 includes (i) a 2×2 array 330 of four patch antennas 332 formed on a first plane corresponding to the back surface of wireless device 310 and (ii) a 2×2 array 340 of four patch antennas 342 formed on a second plane corresponding to the top surface of wireless device 310. As depicted in FIG. 3, the second plane is at a 90 degree angle respective to the first plane. The 90 degree angle is exemplary only and not a limitation as other orientations between one or more antenna arrays maybe be used. For example, the array 340 may be angled with respect to the top of the wireless device 310 such that the angle between the first plane and the second plane is greater or less than 90 degrees. The patch antenna arrays 330, 340 are disposed on the inside of a device cover 312. The antenna array 330 has an antenna beam 350, which points in a direction that is generally orthogonal to the first plane on which patch antennas 332 are formed in the illustrated embodiment (and/or which may be steered away from orthogonal in some embodiments). Antenna array 340 has an antenna beam 360, which points in a direction that is generally orthogonal to the second plane on which patch antennas 342 are formed in the illustrated embodiment (and/or which may be steered away from orthogonal in some embodiments). Antenna beams 350 and 360 thus represent the LOS coverage of wireless device 310. As described with respect to the wireless device 210 in FIG. 2, the device cover 312 may cause a decrease in the strength of transmitted signals and/or decrease the strength of received signals. In the embodiment illustrated in FIG. 3, the device cover may cover all or only a portion of the back of the wireless device (e.g., so as to cover the array 330). In some embodiments, the device cover 312 extends around one or more edges of the device 310 so as to cover the array 340 as well. In some embodiments, a portion of the cover 312 on the back of the device and a portion of the cover 312 along the top or other edges are formed of different materials and thus affect signals communicated to/from the arrays 330, 340 differently.

An access point 390 (i.e., another device) may be located inside the LOS coverage of antenna beam 350 but outside the LOS coverage of antenna beam 360. Wireless device 310 can transmit a first signal to access point 390 via a LOS path 352 within antenna beam 350. Another access point 392 may be located inside the LOS coverage of antenna beam 360 but outside the LOS coverage of antenna beam 350. Wireless device 310 can transmit a second signal to access point 392 via a LOS path 362 within antenna beam 360. Wireless device 310 can transmit a signal to access point 392 via a NLOS path 354 composed of a direct path 356 and a reflected path 358 due to a wall 380. Access point 392 may receive the signal via LOS path 362 at a higher power level than the signal via NLOS path 354. The device cover 312 may absorb the signals radiating from, or intended to be received by, the arrays 330, 340 based on the composition of the device cover (e.g., dielectric constant).

The wireless device 310 shows an exemplary design of a 3-D antenna system comprising two 2×2 antenna arrays 330 and 340 formed on two planes. In general, a 3-D antenna system may include any number of antennas formed on any number of planes pointing in different spatial directions (including a single plane in which multiple antennas radiate in different directions). The planes may or may not be orthogonal to one another. As described herein, the first antenna array 330 may include one or more driven elements (e.g., a first radiator) on a first plane and one or more passive elements (e.g., a second radiator) on a second plane substantially parallel to the first plane. The second antenna array may include one or more driven elements (e.g., a third radiator) on a third plane, which is at an angle to the first plane, and one or more passive elements (e.g., a fourth radiator) on a fourth plane located with respect to the third plane, for example substantially parallel to the third plane. The device cover 312 may be a single component, or assembled from multiple components, configured to enclose and protect device components from environmental and operational factors (e.g., impact damage, water resistance, skin oils, etc . . . ). In certain embodiments, the interior surface of the device cover 312 may form a first inside surface on the second plane and/or a second inside surface on the fourth plane.

Figure 4B:
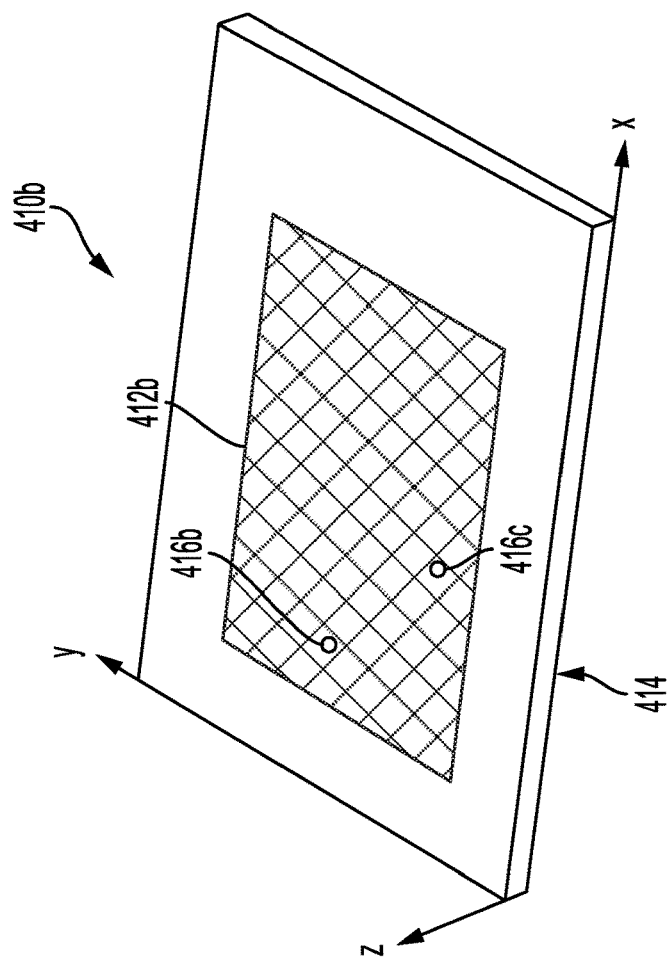
FIGS. 4A-4C show exemplary designs of a patch antenna.
Figure 4A:
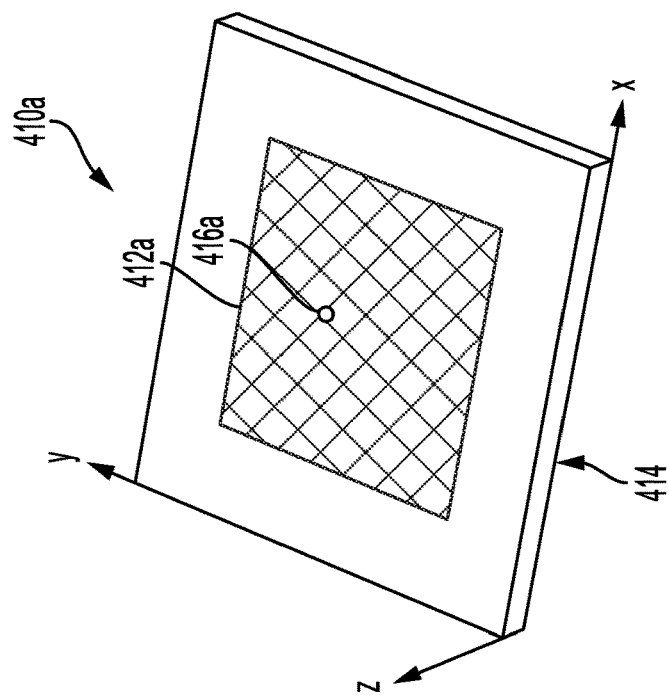

Referring to FIG. 4A, an exemplary design of a patch antenna 410a suitable for MMW frequencies is shown. The patch antenna 410a includes a radiator such as a conductive patch 412a formed over a ground plane 414. In an example, the patch 412 has a dimension (e.g., 1.55×1.55 mm) selected based on the desired operating frequency. For example, each side of the patch 412a may be approximately equal in length, and may be approximately a quarter or a half of a wavelength (of the desired operating frequency) long. The ground plane 414 has a dimension (e.g., 2.5×2.5 mm, or larger) selected to provide the desired directivity of patch antenna 410. A larger ground plane may result in smaller backlobes. In some embodiments, the ground plane 414 extends beneath an array of patch antennas 410a. In an example, a feedpoint 416a is located near the center of patch 412a and is the point at which an output RF signal is applied to patch antenna 410a for transmission. The location of feedpoint 416a may be selected to provide the desired impedance match to a feedline. While one feedpoint 416a is illustrated in FIG. 4A, an additional feedpoint may be implemented, for example such that the patch antenna 410a may transmit or receive signals in two polarizations. Additional patches may be assembled in an array (e.g., 1×2, 1×3, 1×4, 2×2, 2×3, 2×4, 3×3, 3×4, etc . . . ) to further provide a desired directivity and sensitivity.

FIG. 4B is another exemplary design of a patch antenna 410b. In the embodiment illustrated in FIG. 4B, two of the sides of the patch 412b are a first length, while the other two sides of the patch 412b are a second, different length. In this embodiment, the antenna 410b may be configured to operate at two different frequencies, for example which correspond to the first length and the second length. In this way, the antenna 410b may be configured for dual-band operation. The feedpoints 416b and 416c may be configured to supply or receive signals at respective frequencies. For example, the feedpoint 416b may be configured to supply signals at a frequency of approximately 39 GHz to radiate from the side of the patch 412b nearest the illustrated "y" axis. As another example, the feedpoint 416c may be configured to supply signals at a frequency of approximately 28 GHz to radiate from the side of the patch 412b nearest the illustrated "x" axis.

The patches 412a, 412b may be implemented on or in a multilayer substrate, for example as metal on one or more layers of the substrate. In such embodiments, the patch 412 may be substantially planar. FIGS. 4A and 4B each illustrate a single patch layer 412, but the antennas 410a and 41b may include additional patch layers (e.g., approximately parallel to the patch 412, but spaced from the patch 412 along the "z" axis). These additional patch layers may be actively driven with one or more additional feedpoints, or parasitically driven. The additional patch layers may be sized and/or shaped similar to the patch 412, or may be formed with a different size and/or shape. Further, the antennas 410a, 410b may include one or more parasitic metals displaced laterally from the patch 412 in the xy plane (and/or displaced laterally from an additional patch layer in a plane of the additional patch layer).

Figure 4C:
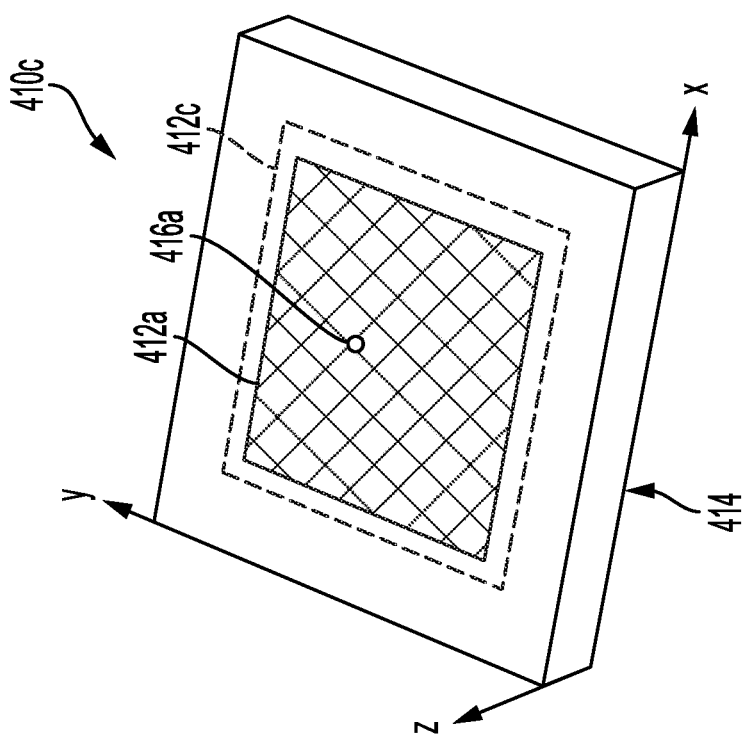

FIG. 4C is another exemplary design of a patch antenna 410c. In the embodiment illustrated in FIG. 4C, the patch 412a illustrated in FIG. 4A is implemented. Further, an additional patch 412c is implemented in a lower layer of a substrate on which the patch 412a is formed. The patch 412c therefore can't be directly observed in FIG. 4C, but is below the patch 412a in the figure and roughly parallel thereto. In some embodiments, a perimeter of the patch 412a is completely within a perimeter of the patch 412c when viewed from a direction normal to the patch 412a and 412c. For example, the patch 412c may be bigger than the patch 412a (along any edge, or along all edges, for example to have a greater area), or vice versa, and therefore may be configured to resonate at a frequency different than the patch 412a. In some embodiments, the patch 412c is actively fed with a feedpoint (not illustrated). In other embodiments, the patch 412c is parasitically coupled to the patch 412a. The antenna 412c may therefore be configured to resonate at two different bands (for example, dual resonance at approximately 28 GHz and approximately 39 GHz), or may be configured to resonate across a band that encompasses multiple frequencies (e.g., from approximately 26.5 GHz to approximately 40.5 GHz).

Referring to FIGS. 5A and 5B, a side view and top view of an example patch antenna array in a wireless device 510 is shown. The wireless device 510 includes a display device 512, a device cover 518, and a main device printed circuit board (PCB) 514. The device cover 518 is typically made of a plastic material such as polycarbonate or polyurethane. In some devices, the cover may be constructed of a glass or a ceramic structure. Other non-conductive materials may also be used for device covers. A MMW module PCB 520 is operably coupled to the main device PCB 514 via one or more ball grid array (BGA) conductors 522a-b. The MMW module PCB 520 may include a plurality of patches 524a-d and corresponding passive patches 526a-b to form a wideband antenna. For example, a stack of patches (e.g., 524a, 526a) may include an actively driven element and one or more passive or parasitic elements. The MMW module PCB 520 also includes signal and ground layers which further increase the thickness (e.g., height) of the PCB 520. An integrated circuit (RFIC) 516 is mounted to the MMW module PCB 520 and operates to adjust the power and the radiation beam patterns associated with the patch antenna array 524a-d. The RFIC 516 is an example of an antenna controller means. For example, the integrated circuit 516 may be configured to utilize phase shifters and/or hybrid antenna couplers to control the power directed to the antenna array and to control the resulting beam pattern.

In operation, the device cover 518 may create a gap 530 between the face of the patch antenna array 524a-d and the inside of the device cover 518. The radiation 532a-b emitted from each patch array element (e.g., 524a-b) is reflected and refracted by the device cover 518 due to dielectric loading and wave reflection (e.g., the reflection and refraction are shown as respective dashed lines in FIG. 5A). A plastic device cover may typically have a dielectric constant (dk) in the range of 2-5 and a dissipation factor (df) in the range of 0.001 to 0.005. Other materials such as glass may be used for the device cover 518 and may have other dielectric properties. In each case, the proximity of the device cover 518 to the patch antenna array 524a-d may detune the antenna and thus degrade the signals transmitting from, and received by, the array. The presence of the device cover 518 may also limit the bandwidth of the patch antenna array 524a-d. The level of the signal degradation may be based on the thickness and material composition of the device cover 518, as well as the size of the gap 530.

Figure 5C:
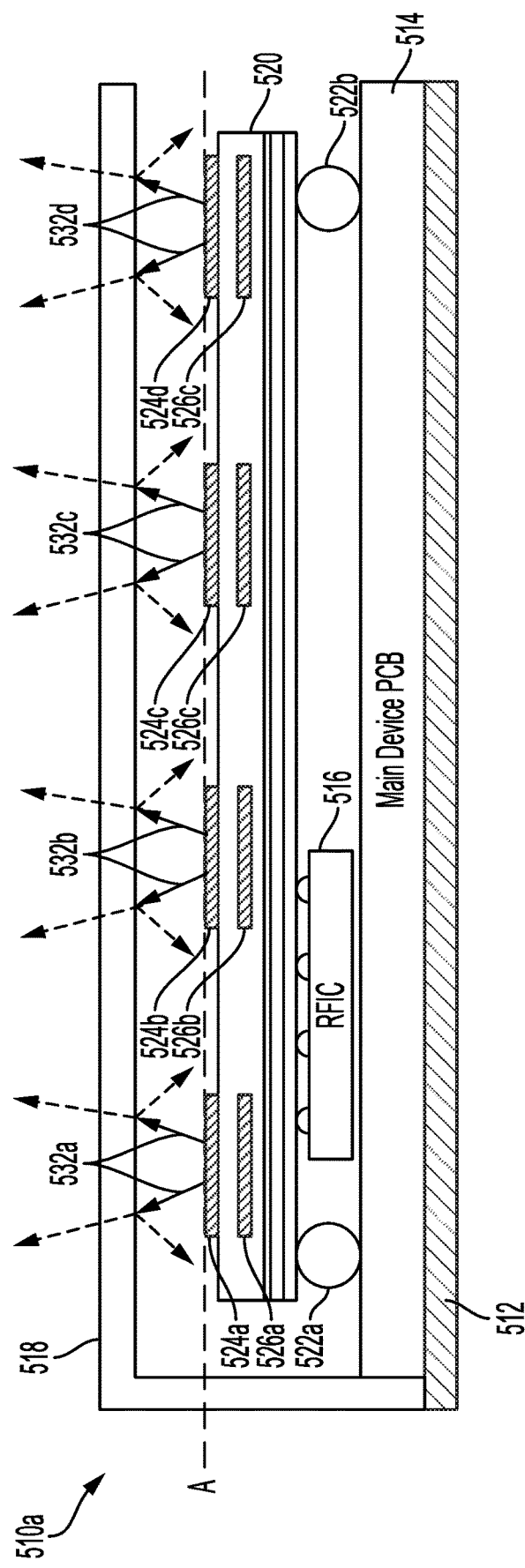
FIGS. 5C and 5D show a side view and top view of another example patch antenna array in a wireless device.
Figure 5D:
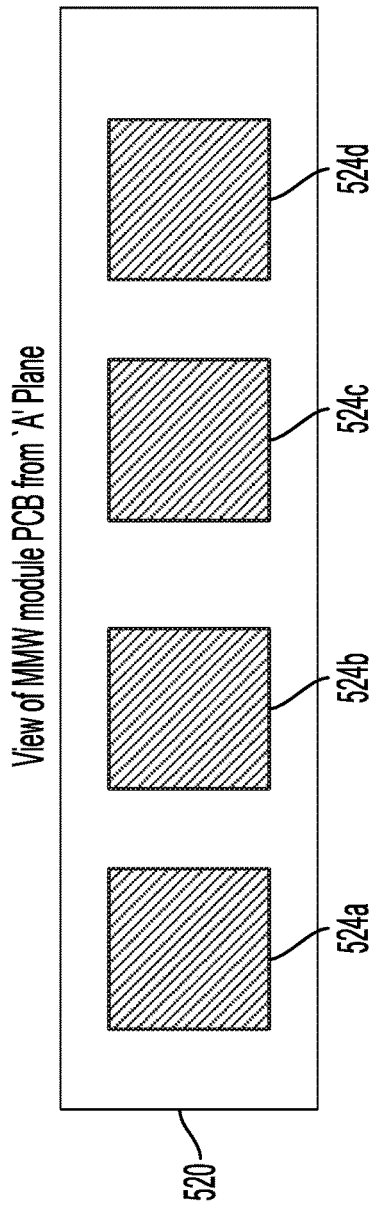

Referring to FIGS. 5C and 5D, a side view and top view of another example patch antenna array in a wireless device 510a is shown. The antenna configuration in 510a is similar to the antenna configuration of 510 (illustrated in FIGS. 5A and 5B), except that the antennas are arranged in a 1×4 array instead of in a 2×2 array. As illustrated in FIGS. 5C and 5D, the antennas may otherwise be configured similarly to the antennas illustrated in FIGS. 5A and 5B.

Figure 5E:
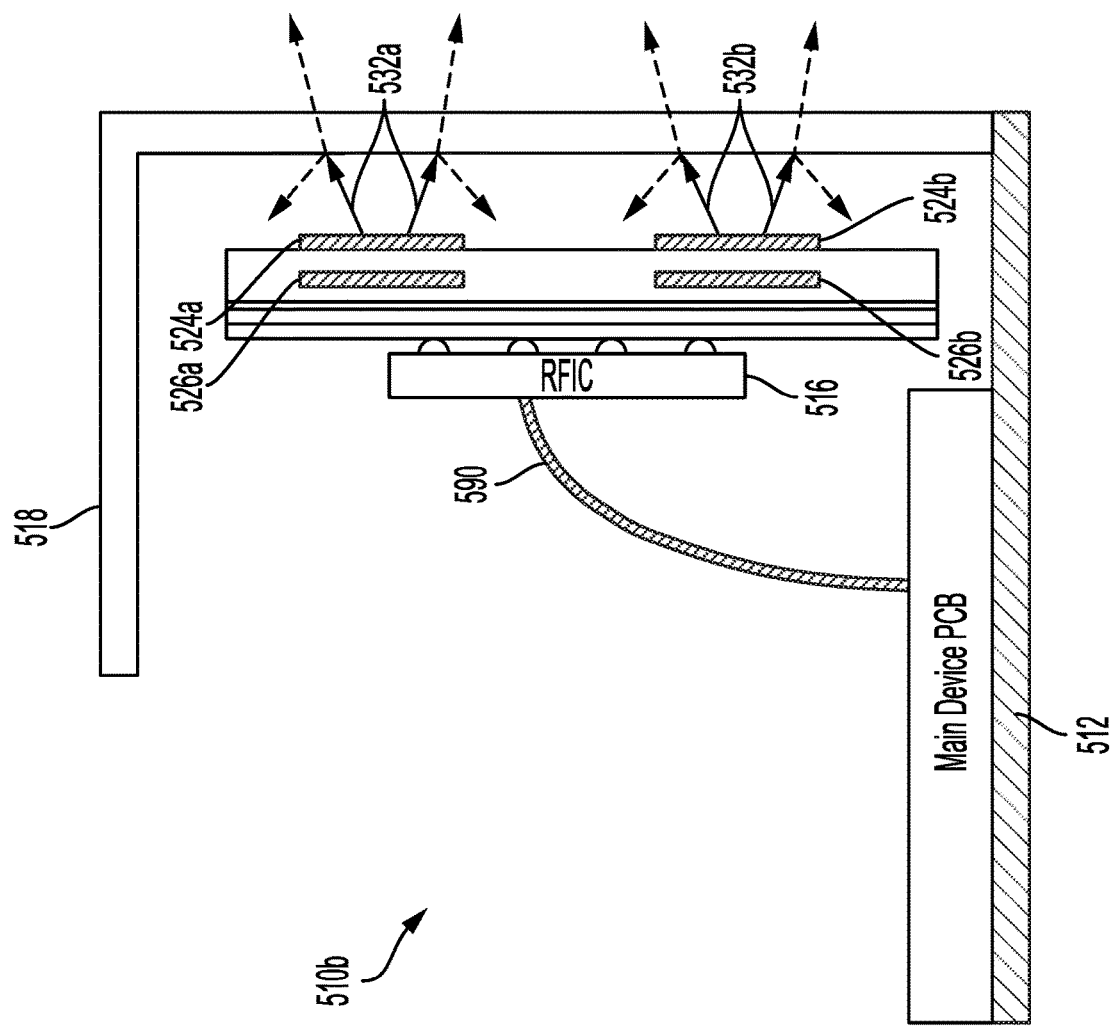
FIG. 5E shows a side view of another example patch antenna array in a wireless device.

Referring to FIG. 5E, a side view of another example patch antenna array in a wireless device 510b is shown. In this configuration, the antenna array is disposed so as to radiate out a side or edge of the device 510b. Thus, in comparison to the device 510 or 510a, the array in 510b is situated so as to be angled (e.g., at a 90 degree angle or another angle) with respect to the main device PCB and/or the display device 512. In some embodiments, a cable or flex PCB or other connection mechanism 590 may communicatively couple the RFIC 516 to one or more components on the main device PCB. The RFIC 516 need not be disposed as illustrated in FIG. 5E. In some embodiments, it is disposed on a same plane as the antennas in the array, for example as opposed to being coupled via balls to an underside of the array.

Figure 5F:
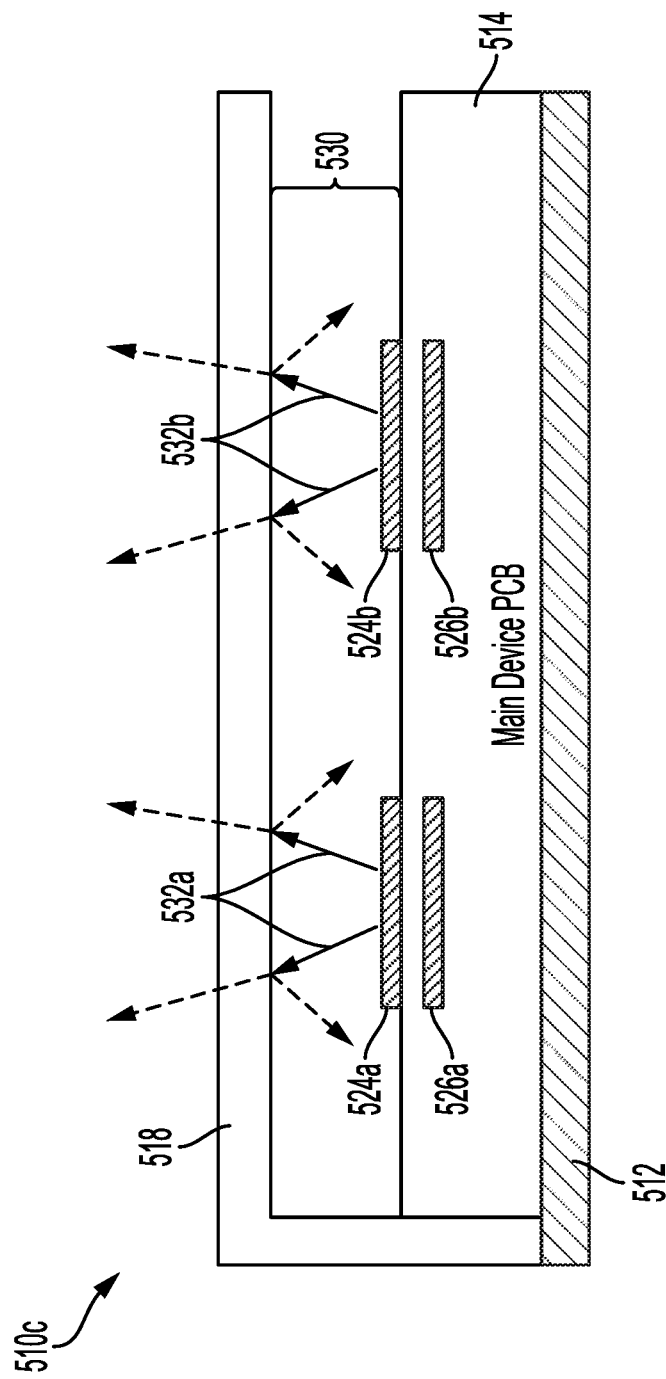
FIG. 5F shows a side view of another example patch antenna array in a wireless device.

Referring to FIG. 5F, a side view of yet another example patch antenna array in a wireless device 510c is shown. In this embodiment, the patch antenna array 524 and/or 526 may be partially or wholly implemented on or in the main device PCB 514. Some example devices may implement both an antenna array on or in the main device PCB 514, as illustrated in FIG. 5F, and an antenna array disposed on a separate board or module, for example as illustrated in any of FIGS. 5A-5E.

Figure 6A:
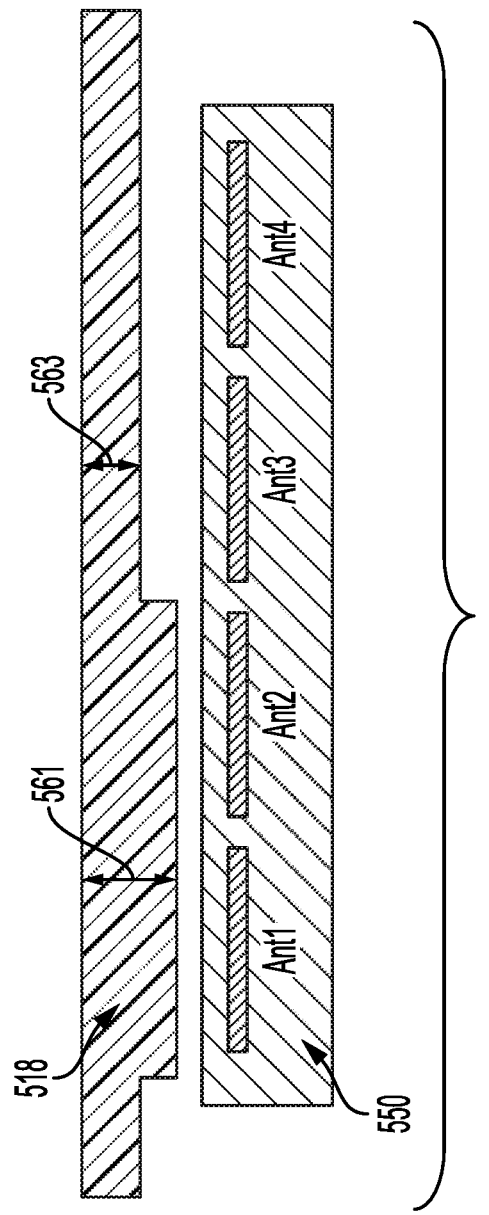
Figure 6B:
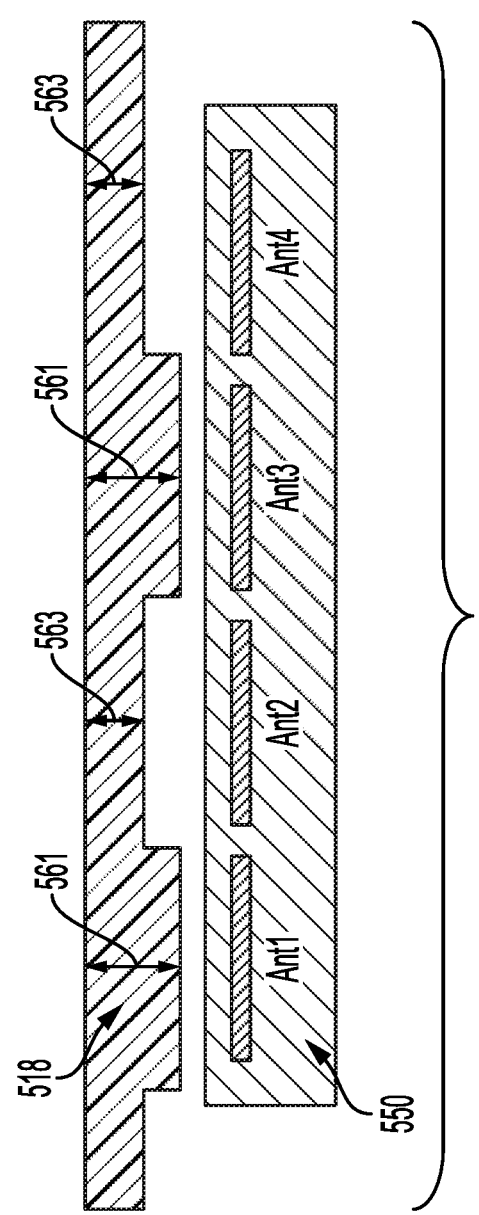

FIGS. 6A and 6B show a side view of an example patch antenna array in a wireless device in relation to a device cover 518 of the wireless device. The configuration illustrated in FIGS. 6-12 is an abstracted view which omits many of the details of FIG. 5. It will be understood that the configurations described with respect to FIGS. 6-12 may be implemented with respect to any of the array configurations described in FIG. 5. For example, the antenna array illustrated in FIGS. 6-12 may be implemented on or in a main device PCB and/or in or on another PCB or in a separate module, or may be disposed so as to radiate primarily out of a back of the device and/or so as to radiate primarily out of a side or edge of the device. Further, while four antennas are illustrated in FIGS. 6-12, it will be understood that a greater or fewer number of antennas may be implemented, and arrays of various sizes and/or configurations (e.g., 1×4, 2×2, etc.) may be implemented. Additionally, each of the antennas in FIGS. 6-12 may be implemented as any one of the antennas 410 illustrated in FIGS. 4A-4C, or may be implemented as another antenna type or configuration. For example, while the antennas are generally described herein as being configured as patch antennas, it will be understood that other types of antennas may be used within the embodiments described with respect to FIGS. 6-12.

As described above, the cover 518 of a wireless device may comprise a glass material or another material, for example a plastic. In some configurations, the cover may be of an approximately uniform thickness, for example as illustrated in FIG. 5. In some embodiments, the thickness of a back portion of the cover may differ from a thickness of a side or edge portion of the cover.

In some embodiments in which the cover is composed of a material with a relatively low dielectric constant (for example in the range of approximately 3-7, as may be present in a plastic or glass cover, as described above), the approximate uniform thickness of the cover may yield acceptable performance in systems employing antennas configured for a plurality of frequencies. To further improve performance, however, the thickness of the cover may vary in relation to antennas configured for communication in different frequencies. Such configuration may be particularly advantageous for covers made of a material having a higher dielectric constant, for example 8 or 10 or above, e.g., $\varepsilon_r=10$-$40$. In some embodiments, such covers having a higher dielectric constant comprise a ceramic material.

As shown in FIGS. 6A and 6B, the thickness of the cover 518 may vary. For example, in FIG. 6A, the cover 518 has a thickness 561 over the antennas ant1 and ant2 (e.g., aligned with a boresight of each of the antennas ant1 and ant2) and has a thickness 563, which is smaller than the thickness 561, over the antennas ant3 and ant4. In some embodiments, the antennas ant1 and ant2 are configured to communicate at a lower frequency than the antennas ant3 and ant4. In some embodiments, the antennas ant1 and ant2 are configured to communicate at a frequency of approximately 28 GHz, while the antennas ant3 and ant4 are configured to communicate at a frequency of approximately 39 GHz or 60 GHz. In other embodiments, the antennas ant1 and ant2 are configured to communicate at a frequency of approximately 24 GHz, while the antennas ant3 and ant4 are configured to communicate at a frequency of approximately 29 GHz. In some embodiments, the thickness 561 and/or the thickness 563 is approximately one half a wavelength at which the corresponding antenna is configured to communicate. The thickness 561 and/or 563 may also be a multiple of a half wavelength, though in many devices there is a desire to reduce or minimize the size of the device; thus, in some devices the thickness 561 and/or 563 is at most approximately one half a wavelength at which the corresponding antenna is configured to communicate.

In some embodiments, one or more of the antennas ant1-ant4 may be configured to radiate in multiple frequencies. For example, ant1 may be configured as a stacked patch configured to radiate in both the 28 GHz and the 39 GHz bands. In such configurations, the thickness 561 may be set between a half wavelength of signals at 28 GHz and a half wavelength of signals at 39 GHz. For example, the thickness 561 may be substantially equivalent to a half wavelength of communications at 35 GHz in some such configurations. In some embodiments, dual band stacked patch antennas are disposed in an array such that they alternate with patch antennas configured for communication in a single band. In such configurations, the thickness 561 may be situated above each of the dual band patch antennas, while the thickness 563 is situated above each of the single band patch antennas in configurations in which the single band patch antenna is configured to resonate at a frequency that is higher than or near the highest frequency of the dual band patch antenna. For example, a dual band patch antenna configured to resonate in both the 28 GHz and the 39 GHz bands may have its boresight aligned with a portion of the cover 518 having the thickness 561, while an antenna configured to resonate in a band at 39 GHz or at 60 GHz may have its boresight aligned with a portion of the cover 518 having the thickness 563. In some configurations of an array including both dual band and single band patch elements, the thickness 561 may be situated above each of the single band patch antennas, while the thickness 563 is situated above each of the dual band patch antennas when the single band patch antenna is configured to resonate at a frequency that is lower than or near the lowest frequency of the dual band patch antenna. In other embodiments, an array includes a plurality of dual band antennas configured to resonant at different sets of frequencies, and the thickness of the cover 518 varies according to the set of frequencies of each antenna.

In some embodiments, the air gap (e.g., the gap 530) between the antenna array and the cover 518 is relatively small compared to the thickness of the cover 518. In some example configurations, the air gap is approximately 10% of the wavelength (e.g., $0.1\lambda$) or less. Thus, the distance between the antenna array and the outside of the cover 518 may be approximately or less than $0.6\lambda$ in some configurations.

The antennas ant1, ant2, ant3, and ant4 are illustrated as being disposed within an element, component, or material 550. The element 550 may be representative of a PCB 514 or a PCB 520, for example, or any means for affixing, supporting, or integrating one or more antennas. The antennas ant1-ant1 may be implemented as an array and/or within a module. Thus, the elements 520 may be representative of a portion of a board on which other components of the device (e.g., wireless device 510) may be disposed or implemented, or may be an abstraction of self-contained module in which the antennas ant1-ant4 are implemented, either alone or with other electronic components that support operation of a phased array (e.g., amplifiers and/phase shifters, etc.).

While the embodiments shown in FIG. 6A has the thickness 561 over the antennas ant1 and ant2, the thickness 561 may be over any or all of the antennas ant1-ant4 (or any other antennas in the array which are not illustrated). For example, the thickness 561 may be associated with the antennas ant1 and ant3, as illustrated in FIG. 6B. The thickness 561 may alternatively or additionally be associated with the antenna ant4. Further, while two thicknesses 561 and 563 are illustrated, additional thicknesses may be implemented, for example based on a frequency at which an associated antenna is configured to communicate.

One such configuration is illustrated in FIG. 6C. In this configuration, at least three thickness 571, 573, and 575 of the cover 518 are implemented. As can be seen in the illustration, the thickness 573 is smaller than the thickness 571, and the thickness 575 is between the thicknesses 571 and 573. Thus, the thickness of the cover 518 in this embodiment are 573<575<571. In an example configuration, ant1 may be configured as a single band antenna configured to resonate at a first frequency. Ant2 and ant3 may be configured as single band antennas configured to resonate a second frequency which is higher than the first frequency. And ant3 may be configured as a dual band antenna configured to resonate at both the first and the second frequencies. Other antenna and array configurations are possible, and additional thicknesses may be implemented.

In FIGS. 6A-6C, the thicknesses 561 and 563 are illustrated as being separated by a sharp step. In some embodiments, however, the thicknesses are separate by a slope or a curvature.

Figure 7C:
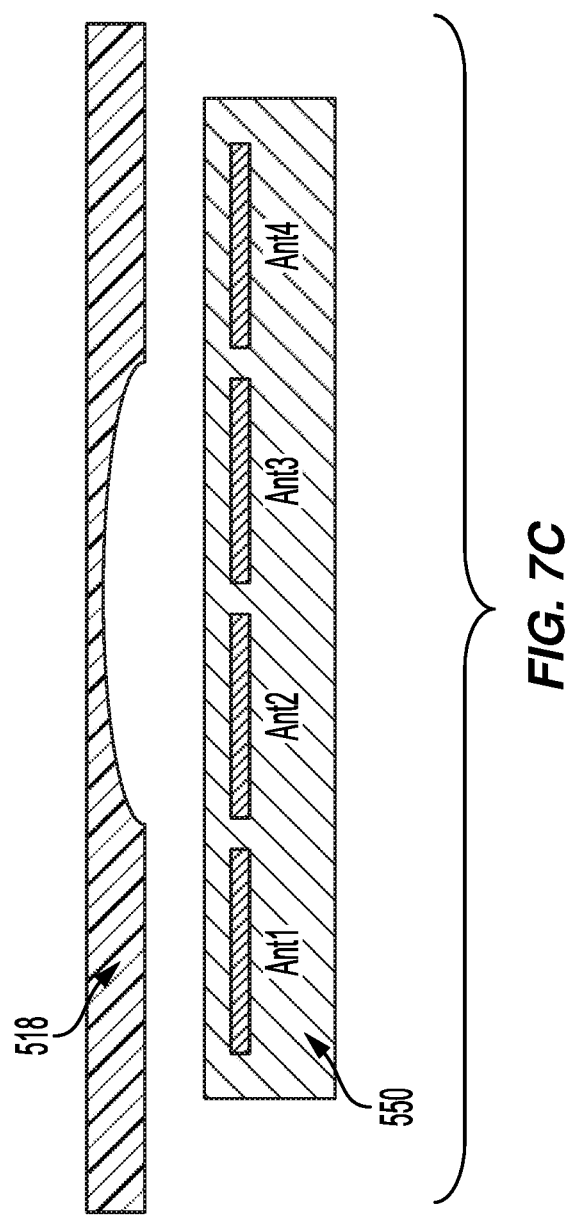

FIGS. 7A-7C illustrates embodiments in which the cover 518 has a non-uniform thickness. In the illustrated embodiments the cover is sloped or curved. For example, the cover 518 may have a convex (FIGS. 7A, 7B) or a concave (FIG. 7C) shape with respect to the array of antennas, and/or may have a constantly varied thickness with respect to the antennas ant1-ant4. The thickness of the cover 518 may vary such that the thickness in a given portion which aligns with a boresight of any particular antenna is approximately one half a wavelength at which the corresponding antenna is configured to communicate (or may otherwise vary as described above with respect to FIGS. 6A-6C). For example, the portion of the cover 518 having the greatest thickness may be disposed over ant2 and ant3 (as illustrated in FIG. 7A) when ant2 and and 3 are configured to transmit at the lowest (or lowest average) frequency. As another example, the portion of the cover 518 having the greatest thickness may be disposed over ant1 and ant2 (as illustrated in FIG. 7B,) when ant1 and and 2 are configured to transmit at the lowest (or lowest average) frequency. In FIG. 7C, the portion of the cover having the greatest thickness is aligned with ant1 and ant4, and the portion of the cover having the smallest thickness is aligned with ant2 and ant3. The portion of the cover 518 having the greatest (or smallest) thickness may also be disposed over a single antenna in an array or over more than two antennas (not illustrated).

Figure 8:
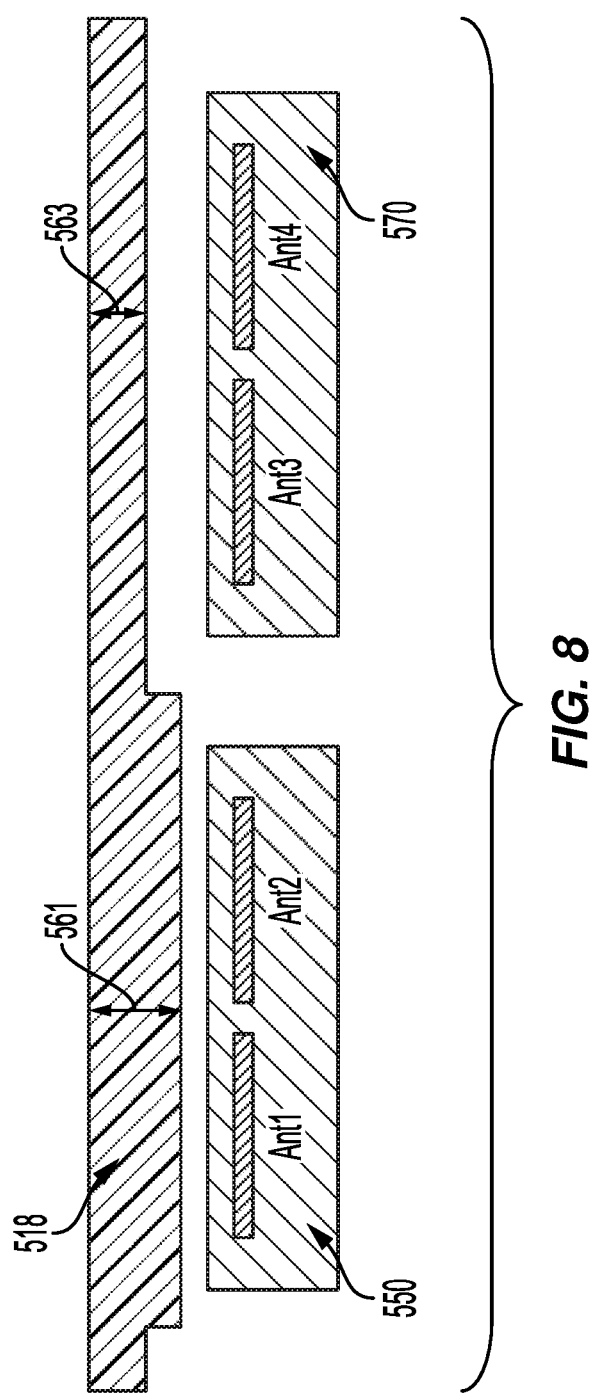
FIG. 8 shows a side view of multiple example patch antenna arrays in a wireless device in relation to a device cover of the wireless device.

FIG. 8 shows a configuration in which two separate antenna arrays are implemented. For example, ant1 and ant2 may be implemented in a first array, while ant3 and ant4 are implemented in a second array. In some embodiments, ant1 and ant2 are configured to communicate in a first frequency band, while ant3 and ant4 are configured to communicate in a second (e.g., higher) frequency band. As shown in FIG. 8, the thickness of the cover 518 may vary not just among antennas in a single array (as shown in FIGS. 6 and 7), but rather between arrays. For example, the thickness 561 may be disposed with respect to (e.g, align with or completely overlap) the entirety of the first array, while the thickness 563 is disposed with respect to the entirety of the second array. The first array and the second array may be disposed on a common circuit board or within a common module, or may be implemented on separate boards and/or modules. The second array is illustrated as having a component 570. The element 570 may be configured similar to the element 550, but is separately numbered to represent that the second array may be implemented independent and/or separate from the first array in some embodiments.

Figure 9A:
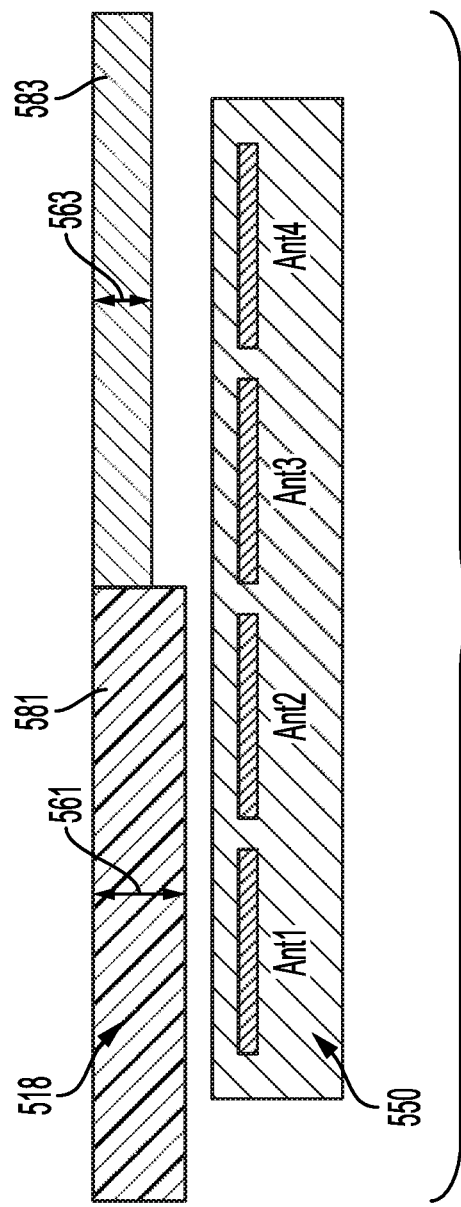
FIGS. 9A and 9B show a side view of an example patch antenna array in a wireless device in relation to a device cover of the wireless device.
Figure 9B:
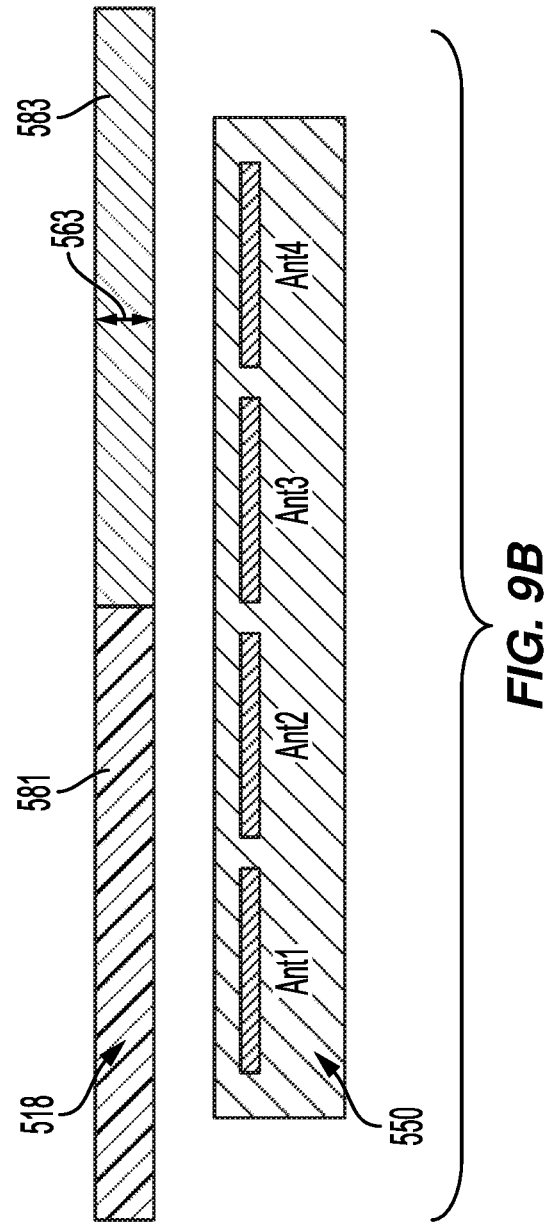

FIGS. 9A and 9B illustrate a cover 518 comprising a first material 581 and a second material 583. For example, the two materials may be selected from a glass, plastic, and ceramic material. In some embodiments, the thickness of the different materials differs, as shown in FIG. 9A. In other embodiments, the thickness of the different materials is approximately equal, for example as shown in FIG. 9B. In one embodiment, a first material with a lower dielectric constant is disposed over antennas configured to operate at a lower frequency, while a second material with a higher dielectric constant is disposed over antennas configured to operate at a higher frequency. In this way, the second material may be utilized in the cover 518, but the thickness of the cover 518 may be maintained approximately constant (or at least below the half wavelength thickness that might otherwise be beneficial if the higher dielectric constant material were disposed over the lower frequency antennas). While two different materials 581, 583 are illustrated, it will be understood that additional materials may be implemented.

Figure 10A:
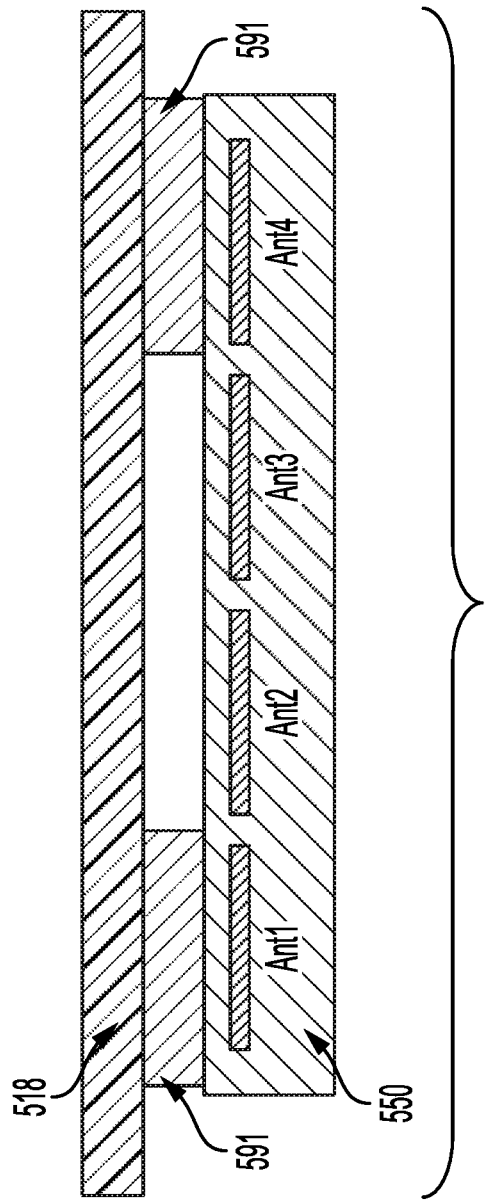
FIGS. 10A and 10B show a side view of example patch antenna arrays in a wireless device in relation to a device cover of the wireless device.
Figure 10B:
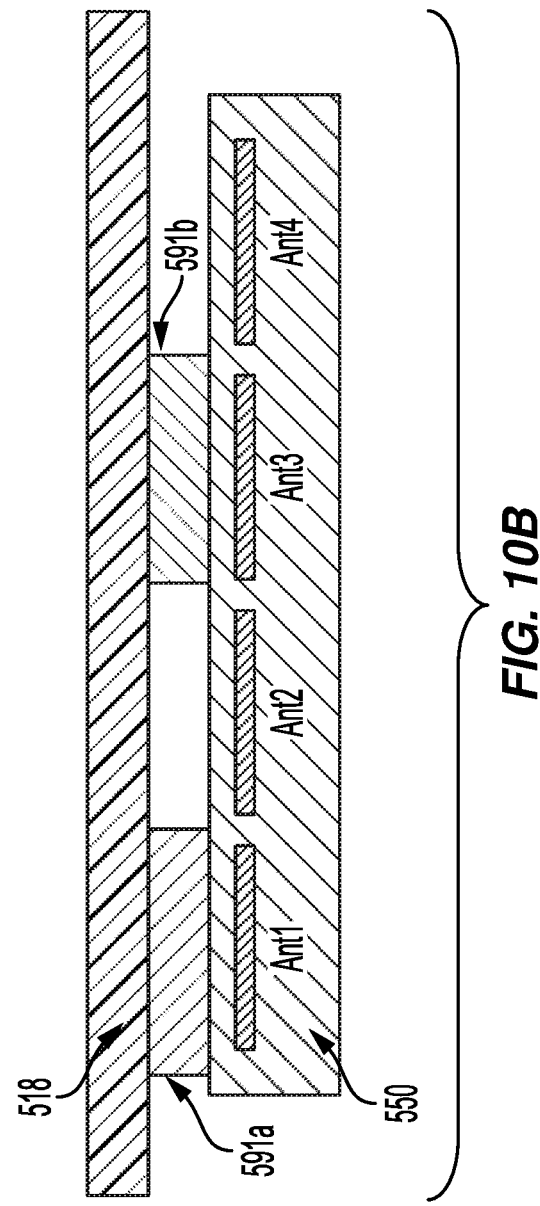

FIGS. 10A and 10B illustrate one or more dielectric pieces or fillers 591 disposed between the antenna array and the cover 518. In some embodiments, the thickness of the piece or filler 591 plus the thickness of the cover 518 is equal to approximately one half a wavelength at which the associated antenna is configured to communicate. For example, in FIG. 10A, the pieces 591 are illustrated as being composed of the same material and the antennas ant1 and ant4 may be configured to communicate in a lower frequency than the antennas ant2 and ant3. The pieces or fillers 591 may have the same dielectric constant as the cover 518, or the dielectric constants may be substantially different. Two or more pieces or fillers 591 may have different thicknesses depending on the antenna with which each is aligned. In some embodiments, for example as illustrated in FIG. 10B, a filler of a first material (e.g., having a first dielectric constant) is disposed over an antenna configured to communicate at a first frequency, and a filler of a second material (e.g., having a second dielectric constant) is disposed over another antenna which is configured to communicate at a second frequency different from the first frequency. In some such embodiments, using fillers of different material and/or dielectric constant may allow the fillers to be of approximate uniform thickness, which may ease manufacturing of a device, while providing appropriate loading of antennas configured to communicate at different frequencies. In some embodiments, a dielectric filler or film is applied over the entirety of a first array having antennas configured to resonate at a first frequency, and the filler or film is omitted from a second array (or a filler or film of different dielectric constant or thickness is applied thereto) having antennas configured to resonate a second frequency.

In FIG. 11, a thickness of a portion of the antenna array is varied (for example, increased in comparison to other illustrated embodiments). For example, the antenna array may be configured as a module, and a molding which is applied to the module may be configured so as to vary in thickness within a single module, or between different modules. The varied thickness of the module may be used exclusive of, or in addition to, a cover 518 of varying thickness and/or a dielectric piece or filler 591.

While the embodiments illustrated in FIGS. 6-12 are shown as separate implementations or solutions, one or more of the embodiments may be combined. For example, as shown in FIG. 12A, a cover 518 of varying thickness may be used in combination with a filler 591. In some embodiments, ant1 and ant4 are configured similarly, but ant1 is aligned with a thicker portion of the cover 518 while ant4 is aligned with the filler 591. In another example, illustrated in FIG. 12B, the fillers 591 are aligned with portions of the cover 518 having a reduce thickness (for example, the thickness 563). The fillers 591 may be applied separate from the cover 518, or may be formed on the cover 518 itself. For example, after the varying thickness of the cover 518 is formed, the material of the fillers 591 may be applied to the cover 518 to fill in some or all of the indentations therein.

In FIG. 12C, the filler 591 is aligned with a portion of the cover having an increased thickness. In some such embodiments, the combination of the filler 591 and the thickness (e.g., the thickness 561) of the cover are used to produce the beneficial effects discussed above.

FIG. 12D illustrates that a module of varying thickness can be combined with one or more other embodiments, for example an embodiment in which the thickness of the cover 518 varies. Other combinations of embodiments described above are possible without being explicitly illustrated herein.

As described above with respect to FIG. 5, antenna arrays may be formed in a linear array (e.g., 1×4) or in a 2-dimensional array, for example across multiple dimensions of a plane (e.g., 2×2). Those of skill in the art will understand that FIGS. 6-12 illustrate a side view of either such array configuration. While not visible in these figures, one of skill in the art will understand how a cover, filler, and/or module may be configured for a 2-D array of antennas. For example, for an interleaved 2-D array of antennas, a cover may have a thickness which varies in a checkerboard type pattern. In another such embodiment, the cover may resemble the surface of a golf ball, for example having dimples therein which align with antennas configured for communication at higher frequencies than their neighbors. In another embodiment, the cover may be formed such that a multitude of bumps appear to protrude from an inside surface of the cover. Thus, the thickness of the cover may vary not only along a first direction or axis, but may also vary along a second direction or axis which is angled (e.g., at a ninety degree angle) with respect to the first. The relative variance in each direction may be approximately the same, or may differ.

Figure 13:
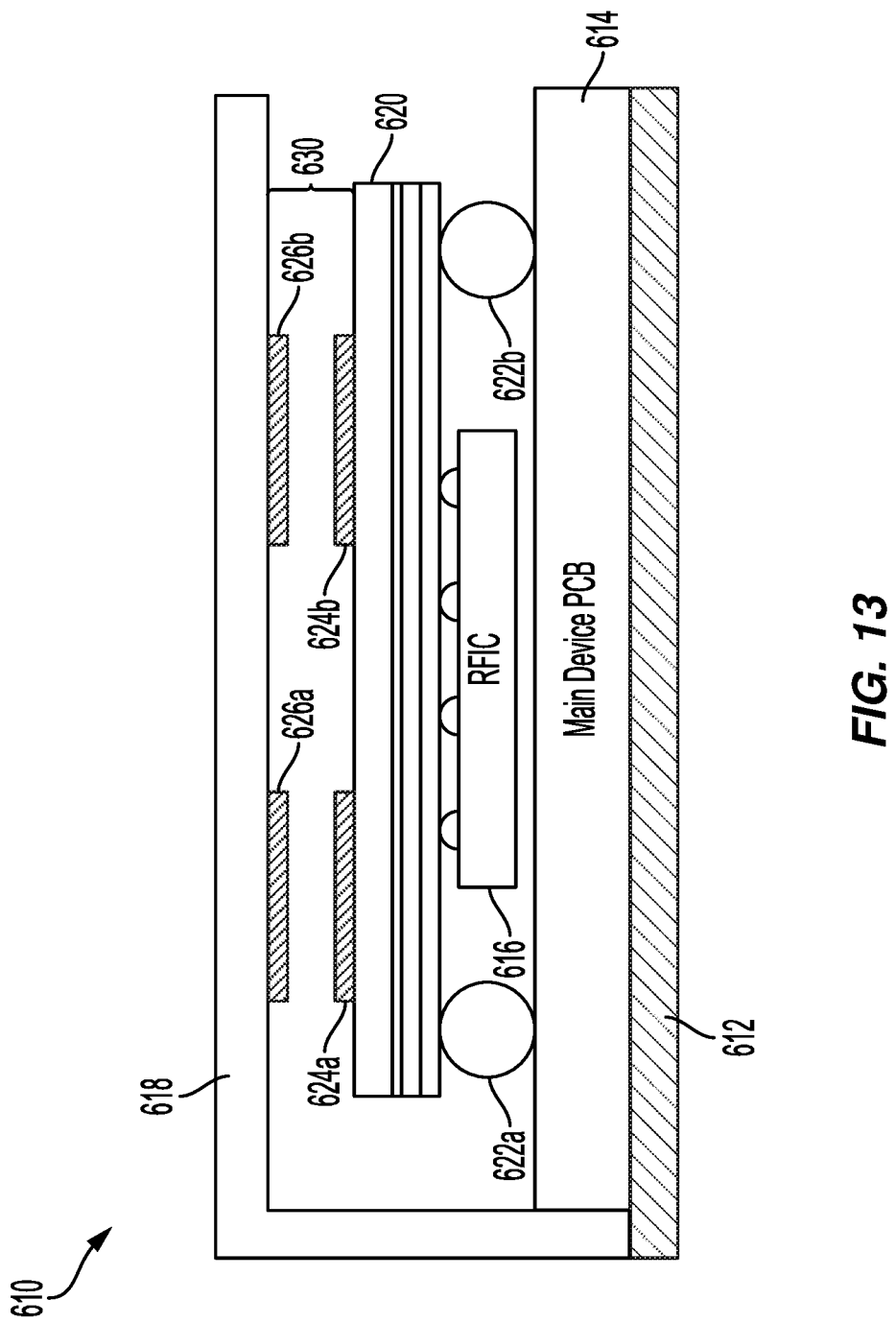
FIG. 13 shows an example of an air coupled superstrate antenna on a device cover.

Referring to FIG. 13, an example of a wireless device 610 with an air coupled superstrate antenna on a device cover is shown. The device 610 includes a display device 612 and device cover 618 configured to be used in a wideband antenna design. The device 610 includes a main device PCB 614 operably coupled to a MMW module PCB 620 via one or more connectors 622a-b in a ball grid array. The MMW module PCB 620 may include a plurality of antennas, for example in a 2×2 array. Two of the four antennas are depicted in FIG. 13 as the first and second lower radiators 624a-b. The MMW module PCB 620 includes signal and ground layers operably coupled to an RF integrated circuit (RFIC) 616 mounted to the MMW module PCB 620. The integrated circuit 616 is an example of an antenna controller and may be configured to utilize phase shifters and/or hybrid antenna couplers to control the power directed to the antenna array and to control the resulting beam pattern radiating from the antenna array (e.g., the lower radiators including the first and second lower radiators 624a-b).

The device cover 618 is an example of a device cover means and may be composed of a plastic, glass, ceramic, or other non-conductive material. The device cover 618 includes a plurality of metal upper radiators 626a-d disposed over the respective lower radiators (e.g., including the first and second lower radiators 624a-b). In the embodiment illustrated in FIG. 13, the upper radiators 626a-d are disposed in a 2×2 array corresponding to the array of lower radiators 624. At least a portion of each of the upper radiators will occupy a position that is orthogonal to a respective lower radiator. In an example, the sizes of the lower and upper radiators will be approximately equal (i.e., +/−10%). The upper radiators may be disposed on the inside surface of the device cover 618 such that the center of the lower and upper radiators may be vertically aligned with one another. In operation, the upper radiators 626 may be configured as passive radiators (e.g., parasitic elements) to modify the radiation pattern of radio waves emitted by the lower radiators 624 (e.g., driven elements), for example to increase the antenna's gain. For example, the upper radiators are configured as passive resonators to absorb the radio waves from the driven elements and re-radiate them at a different phase. The waves from the different radiators interfere constructively to increase the radiation in a desired direction, and destructively to decrease the radiation in undesired directions. The size, shapes and relative positioning of the upper and lower resonators may be modified to change the overall antenna gain. The lower resonators are an example of a first radiating means for radiating a radio signal received from an antenna controller. The upper resonators are an example of a second radiating means for radiating the radio signal received from a driven element.

The disposition of the radiators 626 on the cover 618, as illustrated in FIG. 13, may be implemented with respect to any of the varying device configurations illustrated in FIGS. 6-12. Thus, radiators 626 may be disposed on the surface of a device cover which varies in thickness. In some embodiments, the inside surface of the device cover 618 (or a portion thereof, for example when the device cover is of varied thickness) may be approximately parallel (i.e., +/−5°) to the MMW module PCB 620 and the lower radiators. A parallel gap 630 between the upper and lower radiators may vary based on the frequency, radiator design, and bandwidth requirements. The size of the gap 630 may additionally or instead vary (e.g., may not be constant or uniform) based on the material and/or thickness of the cover 618. For example, the gap 630 may be in a range between 0.2 mm and 1.0 mm for MMW applications. The upper radiators 626 may be printed or affixed to the device cover 618, for example via a laser deposition technology (LDT), a physical vapor deposition (PVD), or other printing and/or deposition technologies. In an example, the upper radiators 626 may be affixed to the device cover 618 with a thermal process, or with an adhesive material. By printing the upper radiators on the inner side of the rear cover with a proper spacing, the overall thickness of the MMW module PCB 620 may be reduced as compared to the example in FIG. 5A. Further, since the device cover 618 is part of the antenna radiator, the gain of the antenna array is increased. The removal of the passive patches 526a-b depicted in FIG. 5A provides a benefit in that fewer layers are needed for the MMW module PCB 620 to maintain the wideband antenna characteristics associated with an antenna array. As a result, the overall thickness of the wireless device 610 with the MMW module PCB 620 integrated inside may be thinner than the design depicted in FIG. 5A.

Those having skill in the art will understand that the terms "upper" and "lower" are used herein with respect to the illustrated figures for ease of description, and not to impose any requirements on the relative configuration of the radiators 624 and 626. For example, the term "lower" may refer to radiators disposed on or within a PCB, while the term "upper" may refer to radiators disposed on or within a cover or housing, irrespective of how the device 610 is facing or which portion of the housing or cover includes the "upper" radiators. While the device 610 is illustrated as having upper radiators disposed on a rear cover (e.g., a cover opposite a display) of the device 610, the air coupled superstrate antenna may be disposed on the device 610 such that the upper radiators are implemented on a top, side, bottom, back/rear, and/or front of the device 610. For example, the device cover 618 may be used in 2-D antenna systems, such as the array 230 depicted in FIG. 2. 3-D solutions may also be realized such that upper radiators may be disposed on two or more surfaces of the device cover 618, which may for example correspond with the patch antenna arrays 330, 340 in FIG. 3. More than one cover assembly (i.e., multiple parts) may be used to dispose the upper radiators above a radiator array at an appropriate gap distance (e.g., based on the operating frequencies of the respective arrays).

While the device cover is described above as comprising a plastic, glass, ceramic, or other non-conductive material, those having skill in the art will understand that a conductive cover having a non-conductive portion (on which the upper radiators are disposed) may also be utilized. The cover may be implemented such the electronics and/or active components are disposed therein or thereon. In some embodiments, one or more upper radiators of the air coupled superstrate antenna are disposed on a component of the device which is neither the cover nor includes active elements or circuitry. For example, such upper radiators may be implemented on a non-conductive substrate that is separate and/or conductively isolated from the PCB on which the lower radiators are disposed. In some embodiments, the upper radiators are not (only) separated from the lower radiators by an air gap, but rather are separated by a dielectric or other material independent from the PCB on which the lower radiators are disposed. For example, with respect to FIG. 13 the gap 630 or a portion thereof may be filled with a dielectric or insulator, or such material may otherwise be disposed between the PCB 620 and the cover 618. In such embodiments, the radiator 626 may be disposed on the cover 618, or may be disposed on or in the material between the PCB 620 and the cover 618, for example such that the radiator 626 is abutting or adjacent the cover 618. In such embodiments, as described above, the filler or insulator may be selectively disposed over certain antennas (e.g., over antennas of a certain wavelength), and/or may vary in material, dielectric constant, and/or thickness.

Figure 14:
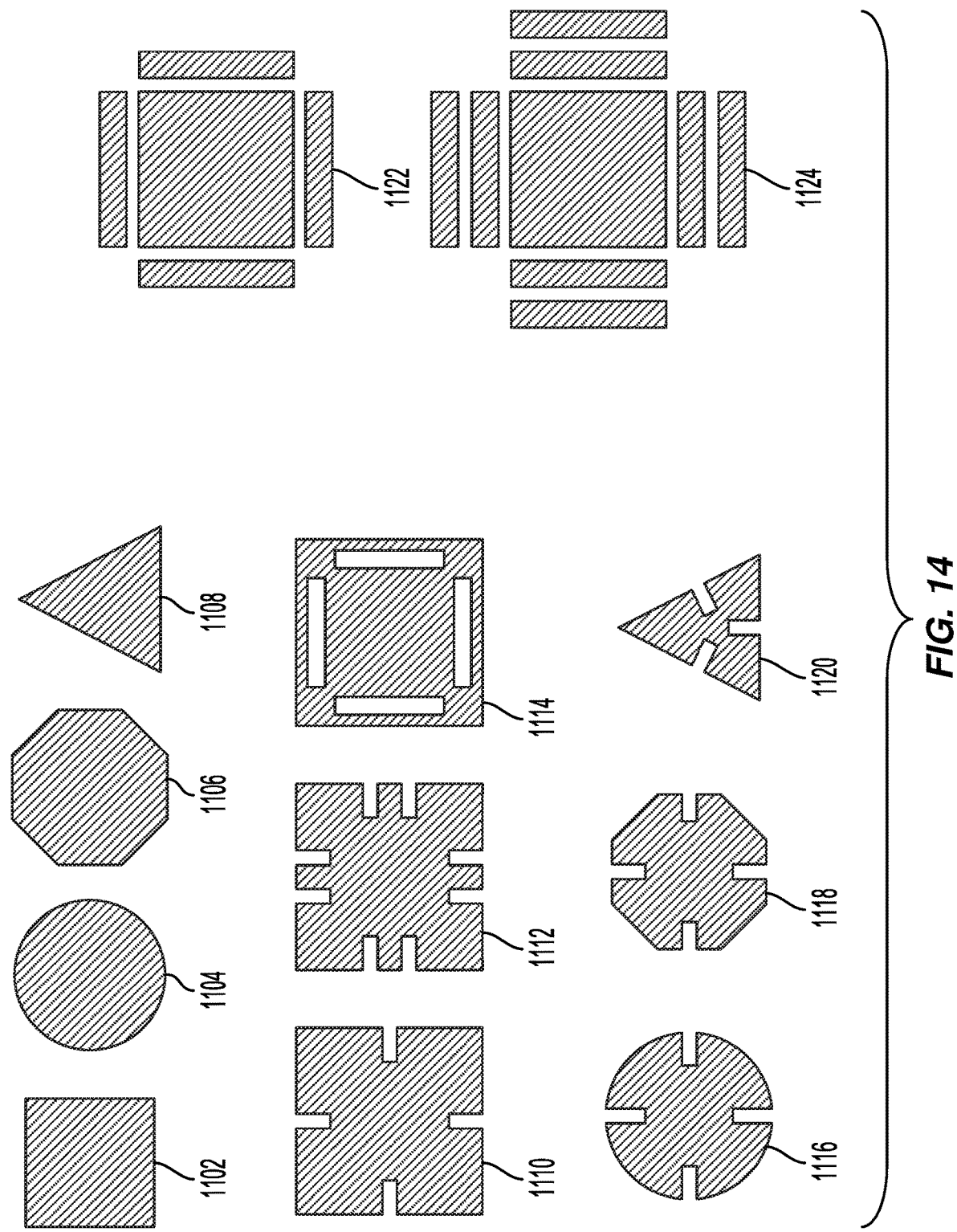
FIG. 14 provides examples of patch antenna geometries.

Referring to FIG. 14, with further references to FIG. 13, examples of patch antenna geometries are shown. In general, the size and shape of a radiator may be varied based on frequency, bandwidth and beam forming requirements. The upper and lower radiators 624a-b, 626a-d in FIG. 13 are depicted as square patches such as the square patch 1102 in FIG. 14. This square geometry is an example only and not a limitation as other radiator shapes and configurations may be used for the configuration in FIG. 13 and in the configurations of FIGS. 6-12. For example, a patch antenna array may be comprised of one or more patches including other shapes such as a circle patch 1104, an octagon patch 1106, and a triangle patch 1108. Other shapes may also be used and an array may include patches with differing shapes. The properties of a patch antenna may be varied by changing the boundaries of the individual patches. For example, a square patch with single notches 1110, a square patch with multiple notches 1112, and a square with parallel notches 1114 may be used as a radiator. The square patch geometry is an example only and not a limitation as other shapes may include one or more notches such as a circle with notches 1116, an octagon with notches 1118, and a triangle with notches 1120. The shape and locations of the notches may vary. For example, the notches may be semicircles, triangles, or other shaped areas of material that are removed from the patch. A patch antenna may include one or more parasitic radiators disposed in proximity to the patch. For example, a patch with one set of parasitic radiators 1122 and a patch with two sets of parasitic radiators 1124 may be used. The geometry, number, and locations of the parasitic radiators may vary based on antenna performance requirements.

Figure 15A:
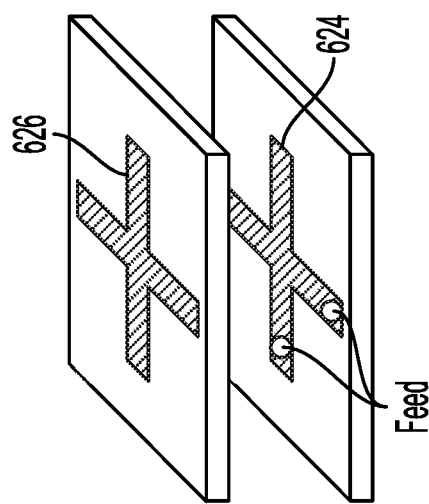
FIGS. 15A-15E provide examples of strip-shape radiators.
Figure 15B:
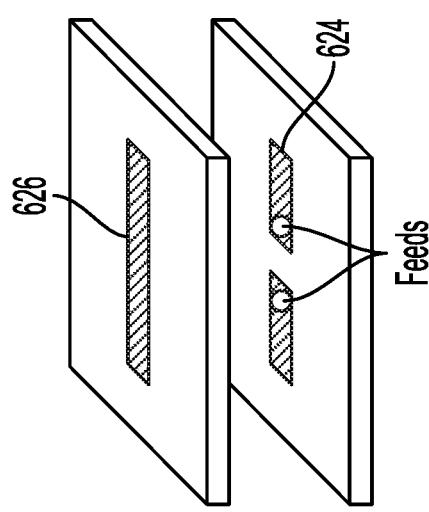
Figure 15C:
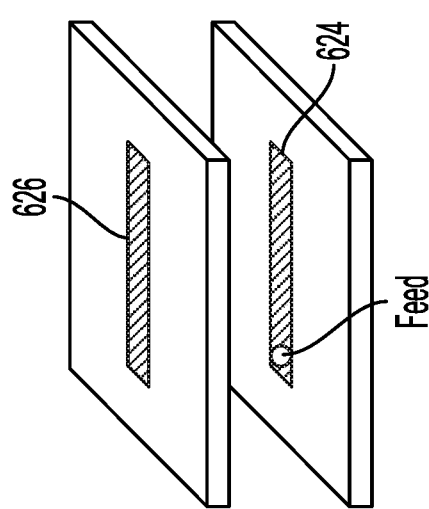
Figure 15E:
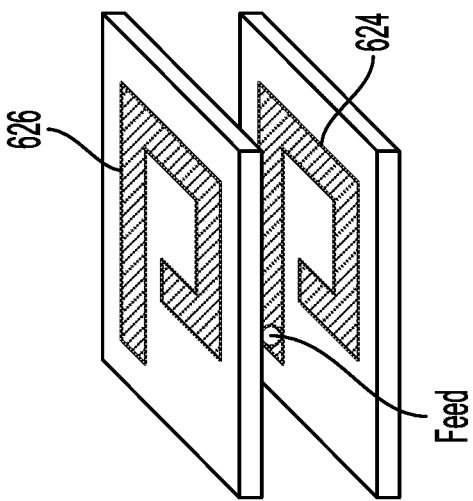
Figure 15D:
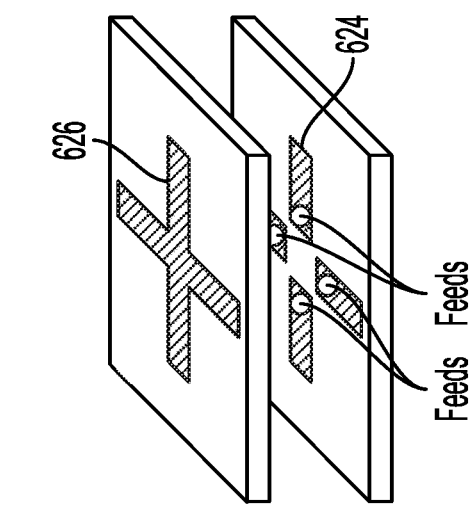

Referring to FIGS. 15A through 15E, and with further reference to FIG. 13, examples of strip-shaped radiators are shown. The upper and lower radiators described herein are not limited to antenna patches as depicted in FIG. 13. The radiators may include one or more strip-shaped antennas with various orientations and feed points for the configuration in FIG. 13 and in the configurations of FIGS. 6-12. While FIGS. 15A-15E depict examples with an upper and a lower radiator, multiple radiator configurations may also utilize strip-shaped radiators. For example, the MMW module PCB 620 may include one or more strip-shaped radiators and feed points and the device cover 618 or display 612 may include one or more strip-shaped radiators as previously described. In FIG. 15A, a first radiator 624 may include a single-ended strip with feed point that is operably coupled to the MMW module PCB 620, and a second radiator 626 may be disposed in or on the device cover 618 or display 612. In FIG. 15B, the first radiator 624 may be configured to receive a differential feed. FIG. 15C, the first radiator 624 may include single-ended strips with dual feeds, and the second radiator may include symmetric single-ended strips. In FIG. 15D, the first radiator 624 may be configured to receive dual differential feeds. The strip-shapes may be configured to form geometric shapes such as circles, spirals, s-shaped, etc. Referring to FIG. 15E, the first radiator 624 may include a single-ended strip and feed with a spiral shape (e.g., for circular polarization), and the second radiator 626 may duplicate the spiral shape in the device cover 618 or display 612 as previously described.

Various aspects are described herein in the context of a wireless device (e.g., the wireless device 110). While the wireless device 110 is described in various forms as a UE, access terminal, etc. those of skill in the art will understand that various teachings herein (for example an antenna array having elements aligned with portions of a device cover having a varying thickness) may be implemented in or applied to other devices which include antennas. For example, the teachings herein may be implemented in an access point, base station, IoT device, etc.

Those of skill in the art will understand that the term "module" as used herein does not describe software and is not used in a nonce context. Rather, "module" describes an assembly of physical (e.g., electronic) components, for example onto a substrate or into a package.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, as used herein, "or" as used in a list of items prefaced by "at least one of" or prefaced by "one or more of" indicates a disjunctive list such that, for example, a list of "at least one of A, B, or C," or a list of "one or more of A, B, or C," or "A, B, or C, or a combination thereof" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Components, functional or otherwise, shown in the figures and/or discussed herein as being connected, coupled (e.g., communicatively coupled), or communicating with each other are operably coupled. That is, they may be directly or indirectly, wired and/or wirelessly, connected to enable signal transmission between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Further, more than one invention may be disclosed.

The invention claimed is:

1. An electronic device, comprising:
a plurality of antennas, comprising
a first antenna configured to transmit or receive signals at a first frequency; and
a second antenna configured to transmit or receive signals at a second frequency; and
a device cover configured to enclose at least a portion of the device and having a thickness which varies according to a frequency at which each antenna of the plurality of antennas is configured to communicate, the device cover having a first thickness in a first area and a second thickness in a second area, the first area being substantially aligned with a boresight of the first antenna, the second area being substantially aligned with a boresight of the second antenna, and the first thickness being different than the second thickness.

2. The device of claim 1, wherein the first antenna comprises a substantially planar radiator, and wherein the first area is substantially aligned with the radiator in a direction normal to a plane of the radiator.

3. The device of claim 2, wherein the second antenna comprises a substantially planar second radiator, and wherein the second area is substantially aligned with the second radiator in a direction normal to a plane of the second radiator.

4. The device of claim 1, wherein the first frequency is lower than the second frequency, and wherein the first thickness is greater than the second thickness.

5. The device of claim 4, wherein the first thickness is approximately half a wavelength of a signal having the first frequency.

6. The device of claim 1, wherein the device cover is comprised of a material having a dielectric constant greater than about 8.

7. The device of claim 6, wherein the device cover is comprised of a material having a dielectric constant in the range of about 10 to about 40.

8. The device of claim 6, wherein no antennas are disposed on the device cover in the first area and no antennas are disposed on the device cover in the second area.

9. The device of claim 1, wherein the first antenna is further configured to transmit or receive signals at the second frequency.

10. The device of claim 1, further comprising a third antenna configured to transmit or receive signals at the first frequency, the device cover having the first thickness in a third area, the third area being substantially aligned with a boresight of the third antenna.

11. The device of claim 10, wherein the first, second, and third antennas are implemented in an antenna array with the second antenna being disposed between the first and third antennas.

12. The device of claim 1, wherein the boresight of the first antenna faces a first direction and the boresight of the second antenna also faces the first direction.

13. The device of claim 1, wherein an inner side of the device cover in the first area or the second area is not curved.

14. An electronic device, comprising:
a plurality of antennas, comprising a first antenna having a first radiator, the first radiator being disposed substantially in a first plane and having a perimeter defined by a first plurality of sides, a first side of the first plurality of sides being of a first length; and
a second antenna having a second radiator, the second radiator being disposed substantially in a second plane and having a perimeter defined by a second plurality of sides, a second side of the second plurality of sides being of a second length, the second length being different than the first length; and
a device cover configured to enclose at least a portion of the device and having a thickness which varies according to a frequency at which each antenna of the plurality of antennas is configured to communicate, the device cover having a first thickness in a first area and a second thickness in a second area, the first area being substantially aligned with the first radiator in a direction substantially orthogonal to the first plane, the second area being substantially aligned with the second radiator in a direction substantially orthogonal to the second plane, and the first thickness being different than the second thickness.

15. The device of claim 14, wherein the first plane and the second plane are substantially coplanar.

16. The device of claim 14, wherein the first plane and the second plane are angled with respect to one another.

17. The device of claim 14, wherein the first antenna further comprises a third radiator disposed substantially in a third plane, the third plane being substantially parallel to the first plane, the third radiator being disposed on an opposite side of the first radiator as the first area of the device cover.

18. The device of claim 17, wherein the third radiator has a perimeter defined by a third plurality of sides, a first side of the third plurality of sides being of a third length, the third length being greater than the first length.

19. The device of claim 14, wherein the device comprises a smartphone, and wherein the device cover comprises a back cover of the smartphone.

20. The device of claim 14, wherein the device comprises a smartphone, and wherein the device cover comprises a top edge of the smartphone.

21. The device of claim 14, further comprising a third antenna, wherein the first antenna and the second antenna are disposed along a first line, and wherein the first antenna and the third antenna are disposed along a second line, the second line being angled with respect to the first line.

22. The device of claim 14, wherein the device comprises an access point or a base station configured to communicate at a millimeter wave frequency.

* * * * *